(12) United States Patent
Yamasaki et al.

(10) Patent No.: US 12,479,138 B2
(45) Date of Patent: Nov. 25, 2025

(54) MOLD, METHOD OF PRODUCING PRODUCT, METHOD OF PRODUCING IMAGE FORMING APPARATUS, AND NON-TRANSITORY COMPUTER-READABLE RECORDING MEDIUM

(71) Applicant: CANON KABUSHIKI KAISHA, Tokyo (JP)

(72) Inventors: Toshiteru Yamasaki, Yokohama (JP); Nobuharu Hoshi, Yokohama (JP); Junichi Matsumura, Numazu (JP); Akira Suzuki, Naka-gun (JP); Hiroki Akatsuka, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/345,181

(22) Filed: Jun. 30, 2023

(65) Prior Publication Data

US 2023/0347559 A1     Nov. 2, 2023

Related U.S. Application Data

(63) Continuation of application No. 16/011,788, filed on Jun. 19, 2018, now abandoned.

(30) Foreign Application Priority Data

| Jun. 22, 2017 | (JP) | ................................ | 2017-122598 |
| Jun. 22, 2017 | (JP) | ................................ | 2017-122599 |
| May 25, 2018 | (JP) | ................................ | 2018-101065 |

(51) Int. Cl.
  B29C 45/04      (2006.01)
  B29C 45/00      (2006.01)
  (Continued)

(52) U.S. Cl.
  CPC ........ *B29C 45/0441* (2013.01); *B29C 45/006* (2013.01); *B29C 45/045* (2013.01);
  (Continued)

(58) Field of Classification Search
  None
  See application file for complete search history.

(56) References Cited

U.S. PATENT DOCUMENTS

| 5,599,486 A | 2/1997 | Fujishiro et al. |
| 5,915,760 A | 6/1999 | Kawase et al. |
| (Continued) | | |

FOREIGN PATENT DOCUMENTS

| CN | 1134873 A | 11/1996 |
| CN | 102448697 A | 5/2012 |
| (Continued) | | |

OTHER PUBLICATIONS

Machine English translation of JP2011178095, Accessed Apr. 29, 2024 (Year: 2011).*

(Continued)

*Primary Examiner* — Abbas Rashid
*Assistant Examiner* — Adrianna N Konves
(74) *Attorney, Agent, or Firm* — Venable LLP

(57) ABSTRACT

A mold includes a rotatable portion, a frame portion, a first and second portion, and a production unit. The rotatable portion has a plurality of surfaces and a plurality of forming portions. The plurality of surfaces is each provided with one of the plurality of forming portions, each having the same shape. The frame portion rotatably supports the rotatable portion. The first portion defines a cavity by coming into contact with one surface of the plurality of surfaces by clamping the mold. The second portion comes into contact with another surface of the plurality of surfaces different (Continued)

from the one surface by clamping the mold. The production unit attached to the frame portion.

23 Claims, 36 Drawing Sheets

(51) Int. Cl.
B29C 45/16 (2006.01)
B29L 31/00 (2006.01)
(52) U.S. Cl.
CPC ........ *B29C 45/162* (2013.01); *B29C 45/1628* (2013.01); *B29C 45/1618* (2013.01); *B29L 2031/7678* (2013.01)

(56) References Cited

U.S. PATENT DOCUMENTS

| | | | |
|---|---|---|---|
| 6,206,681 | B1 | 3/2001 | Kawase et al. |
| 7,951,322 | B2 | 5/2011 | Clark |
| 8,609,012 | B2 | 12/2013 | Altonen et al. |
| 8,899,966 | B2 | 12/2014 | Okamoto |
| 9,718,227 | B2 | 8/2017 | Armbruster |
| 2007/0284784 | A1 | 12/2007 | Clark |
| 2014/0070459 | A1 | 3/2014 | Altonen et al. |
| 2014/0197574 | A1 | 7/2014 | Anderson et al. |
| 2018/0370094 | A1 | 12/2018 | Yamasaki et al. |

FOREIGN PATENT DOCUMENTS

| | | | |
|---|---|---|---|
| CN | 103732376 | A | 4/2014 |
| CN | 206201375 | U | 5/2017 |
| JP | 58-179624 | A | 10/1983 |
| JP | 61-122819 | U | 8/1986 |
| JP | 62-060618 | A | 3/1987 |
| JP | 10-211629 | A | 8/1998 |
| JP | 2000-238090 | A | 9/2000 |
| JP | 2001-044228 | A | 2/2001 |
| JP | 2007-230031 | A | 9/2007 |
| JP | 2010-042519 | A | 2/2010 |
| JP | 2011-056774 | A | 3/2011 |
| JP | 2011-178095 | A | 9/2011 |
| JP | 2012-056150 | A | 3/2012 |
| JP | 2013-132812 | A | 7/2013 |
| JP | 2013-166378 | A | 8/2013 |
| JP | 2013-533818 | A | 8/2013 |
| JP | 2013-224042 | A | 10/2013 |
| JP | 2014-168936 | A | 9/2014 |
| JP | 2019-006109 | A | 1/2019 |
| WO | 2012/006059 | A2 | 1/2012 |
| WO | 2016/124749 | A1 | 8/2016 |

OTHER PUBLICATIONS

First Office Action in Chinese Application No. 202210290531.3 (Dec. 2023).
Notification of Reasons for Refusal in Japanese Application No. 2018-101065 (Jun. 23, 2020).
Third Office Action in Chinese Application No. 201810628279.6 (Sep. 2021).
Notice of Reasons for Refusal in Japanese Application No. 2021-7242 (Jan. 2022).
Notice of Reasons for Refusal in Japanese Application No. 2021-016135 (Jun. 2022).

\* cited by examiner

A - A

B - B

MOLD, METHOD OF PRODUCING PRODUCT, METHOD OF PRODUCING IMAGE FORMING APPARATUS, AND NON-TRANSITORY COMPUTER-READABLE RECORDING MEDIUM

CROSS-REFERENCE TO RELATED APPLICATIONS

This application is a continuation application of U.S. patent application Ser. No. 16/011,788, filed Jun. 19, 2018, which claims the benefit of Japanese Patent Application No. 2017-122598, filed Jun. 22, 2017, Japanese Patent Application No. 2017-122599, filed Jun. 22, 2017, and Japanese Patent Application No. 2018-101065, filed May 25, 2018. All of these prior applications are hereby incorporated by reference herein in their entirety.

BACKGROUND OF THE INVENTION

Field of the Invention

The present invention relates to a mold including a rotatable portion, a method of producing a product, a method of producing an image forming apparatus, and a non-transitory computer-readable recording medium.

Description of the Related Art

Conventionally, a unit part constituted by a plurality of resin members is assembled by an assembling robot or a manual work after individually forming the members constituting the unit part by an injection molding machine or the like and then conveying, in other words, supplying the members to a production line of the unit part.

In recent years, for example, as disclosed in Japanese Patent Laid-Open No. 2011-56774, an apparatus that forms a plurality of molded products using a rotatable intermediate mold, a first injection unit of an injection molding machine, and a second injection unit attached to the injection molding machine is proposed.

However, in such a molding machine as disclosed in Japanese Patent Laid-Open No. 2011-56774 described above, a large mechanism for moving the second injection unit is required, and thus there is a risk that the size of the apparatus increases. Further, since the second injection unit is attached to the injection molding machine, it is difficult to adjust the position of the second injection unit with respect to a mold.

SUMMARY OF THE INVENTION

According to one aspect of the present invention, a mold includes, a rotatable portion having a plurality of surfaces and a plurality of forming portions, the plurality of surfaces being each provided with one of the plurality of forming portions, the plurality of forming portions each having the same shape, a frame portion configured to rotatably support the rotatable portion a first portion configured to define a cavity by coming into contact with one surface of the plurality of surfaces by clamping the mold, a second portion configured to come into contact with another surface of the plurality of surfaces different from the one surface by clamping the mold, and a production unit attached to the frame portion.

According to another aspect of the present invention, a mold configured to define a cavity by bringing a first surface and a second surface into contact with each other. The mold has a movement portion configured to move a piece portion. A first forming portion and a second forming portion are formed on the first surface, and at least one of the first forming portion and the second forming portion is formed on the piece portion.

According to another aspect of the present invention, a method of producing a product by using a mold, the mold including: a rotatable portion having a plurality of surfaces and a plurality of forming portions, the plurality of surfaces being each provided with one of the plurality of forming portions, the plurality of forming portions each having the same shape, and a frame portion configured to rotatably support the rotatable portion. The method includes a step of forming a first formed member and a second formed member on a first surface of the rotatable portion by moving the first surface to a first position of the frame portion, and a step of moving the first formed member and the second formed member formed on the first surface to a second position of the frame portion by rotating the rotatable portion to subject part of at least one of the first formed member and the second formed member to a production process.

According to another aspect of the present invention, a method of producing a product uses a first formed member and a second formed member. The first formed member and the second formed member are formed at a second portion of a mold by injecting resin into a cavity defined by a forming portion formed in a first portion of the mold and a forming portion formed in the second portion of the mold and releasing solidified resin. The forming portion formed in the second portion includes a first forming portion and a second forming portion, the second forming portion being formed on a piece portion. The first formed member and the second formed member are joined with each other by moving the second formed member formed on the second forming portion onto the first formed member formed on the first forming portion by moving the piece portion.

Further features of the present invention will become apparent from the following description of exemplary embodiments (with reference to the attached drawings).

BRIEF DESCRIPTION OF THE DRAWINGS

FIG. 29B is a section view of the mold taken along an A-A line of FIG. 29A.

DESCRIPTION OF THE EMBODIMENTS

First Exemplary Embodiment

A first exemplary embodiment of the present invention will be described below with reference to attached drawings. To be noted, configurations shown below are merely examples, and, for example, details thereof can be modified by one skilled in the art within the scope of the present invention. In addition, numerical values mentioned in the present exemplary embodiment are just for reference and should not limit the present invention.

Figure 1:
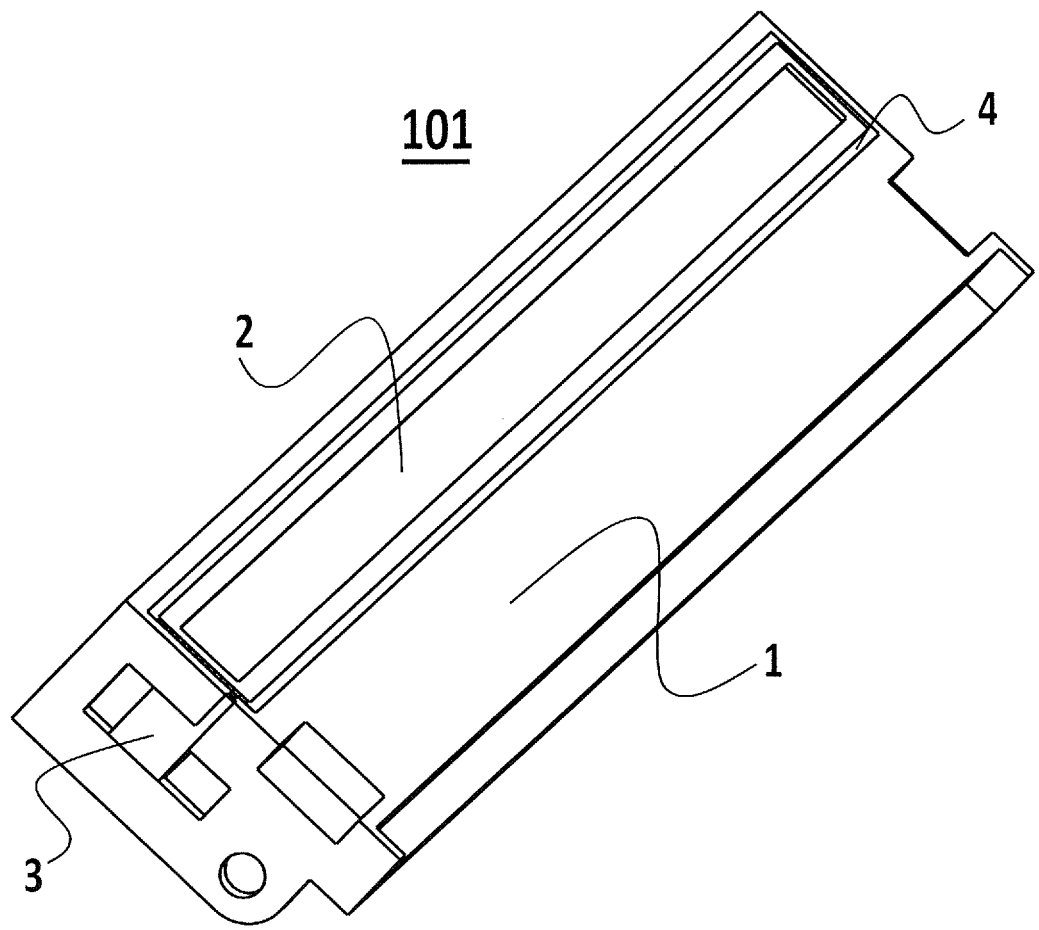
FIG. 1 is a perspective view of an example of a part produced in a first exemplary embodiment of the present invention.

FIG. 1 illustrates an example of a part 101 produced by a mold of the present exemplary embodiment. FIG. 1 illustrates the part 101 that has been molded and assembled by using the mold of the present exemplary embodiment. The part 101 of FIG. 1 is, for example, a part constituting an image forming apparatus, and includes formed members 1, 2, and 3, and a joint member 4.

The former members 1 to 3 and the joint member 4 are integrated as a unit as illustrated in FIG. 1 by performing a production process by using a mold illustrated in, for example, FIGS. 2A to 4 and 36, and thereby serves as the part 101 of the image forming apparatus. The image forming apparatus has a mount configured to mount the part 101, which can be produced as some cartridge part for the apparatus, by the production method of the present exemplary embodiment. The production process includes injection molding of a molding material, for example, molten resin, and assembly.

In the unitized state of FIG. 1, the formed member 3 is integrally formed with the formed member 1. In addition, the formed member 1 and the formed member 2 are positioned each other by engaging with each other, and are joined with each other by the joint member 4.

Figure 2A:
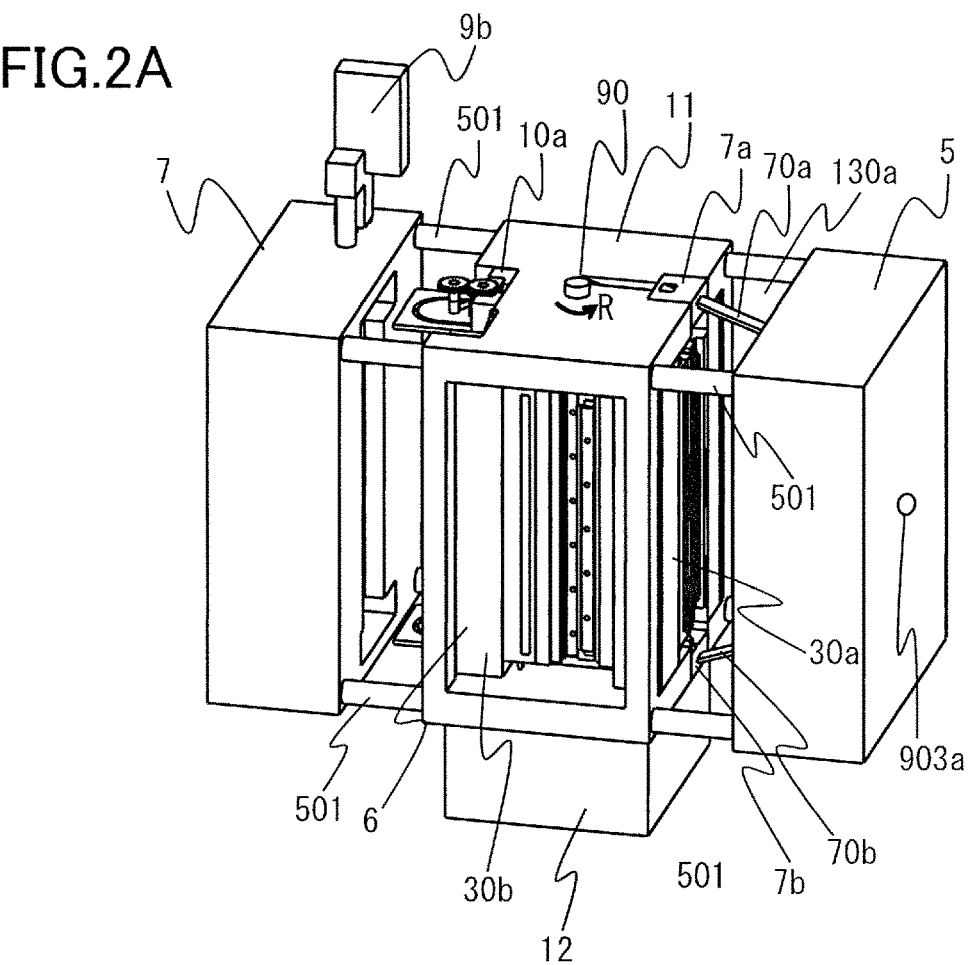
FIGS. 2A and 2B illustrate a configuration of a mold, FIG. 2A being a perspective view of the mold, FIG. 2B being a top view of the mold illustrating a production process performed by the mold.
Figure 2B:
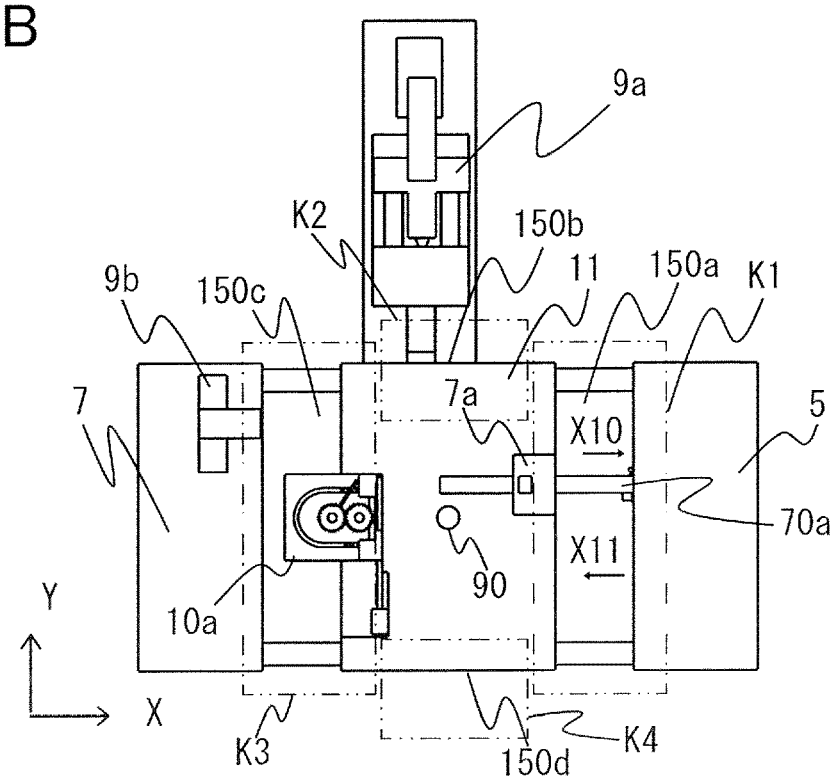
Figure 3:
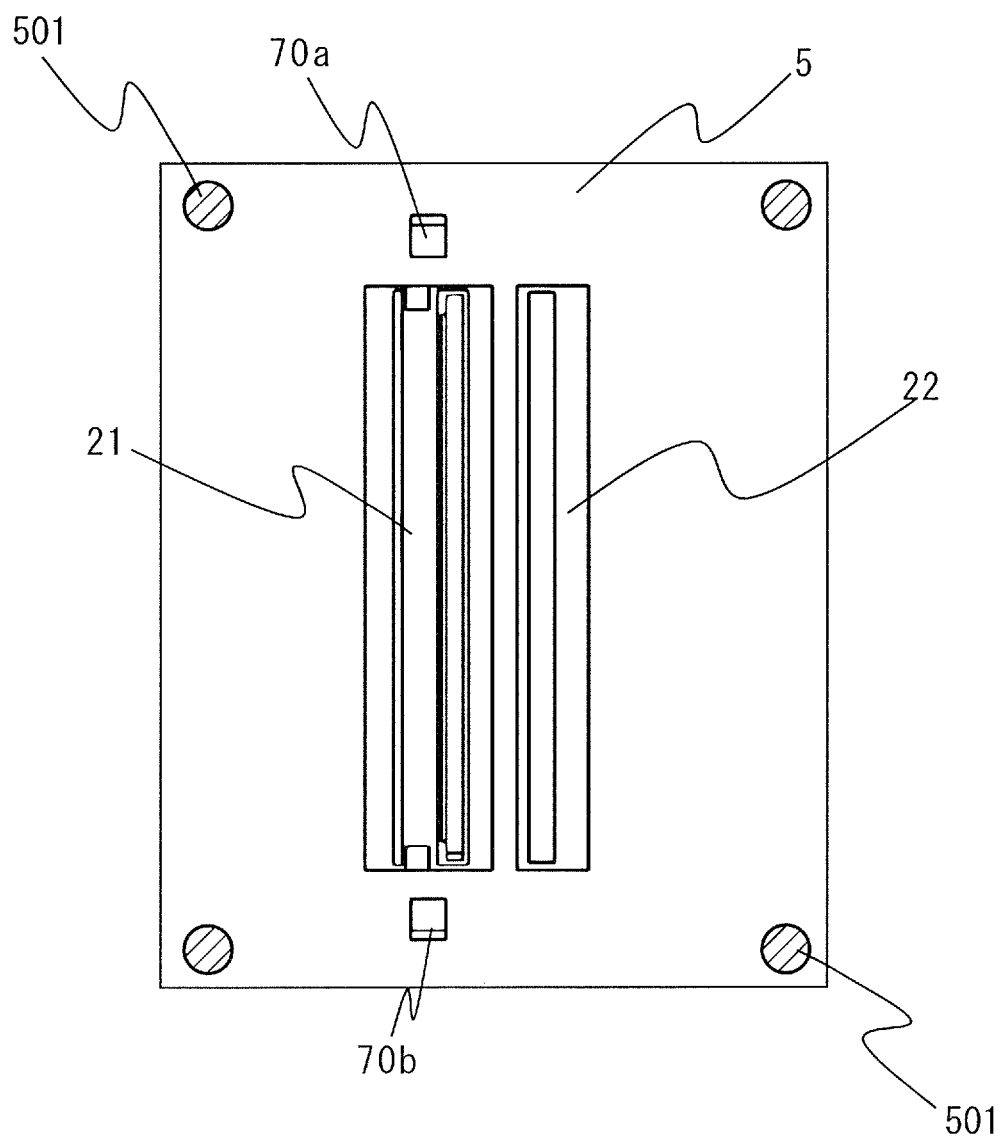
FIG. 3 is a front view of a fixed portion illustrating a configuration thereof.
Figure 4:
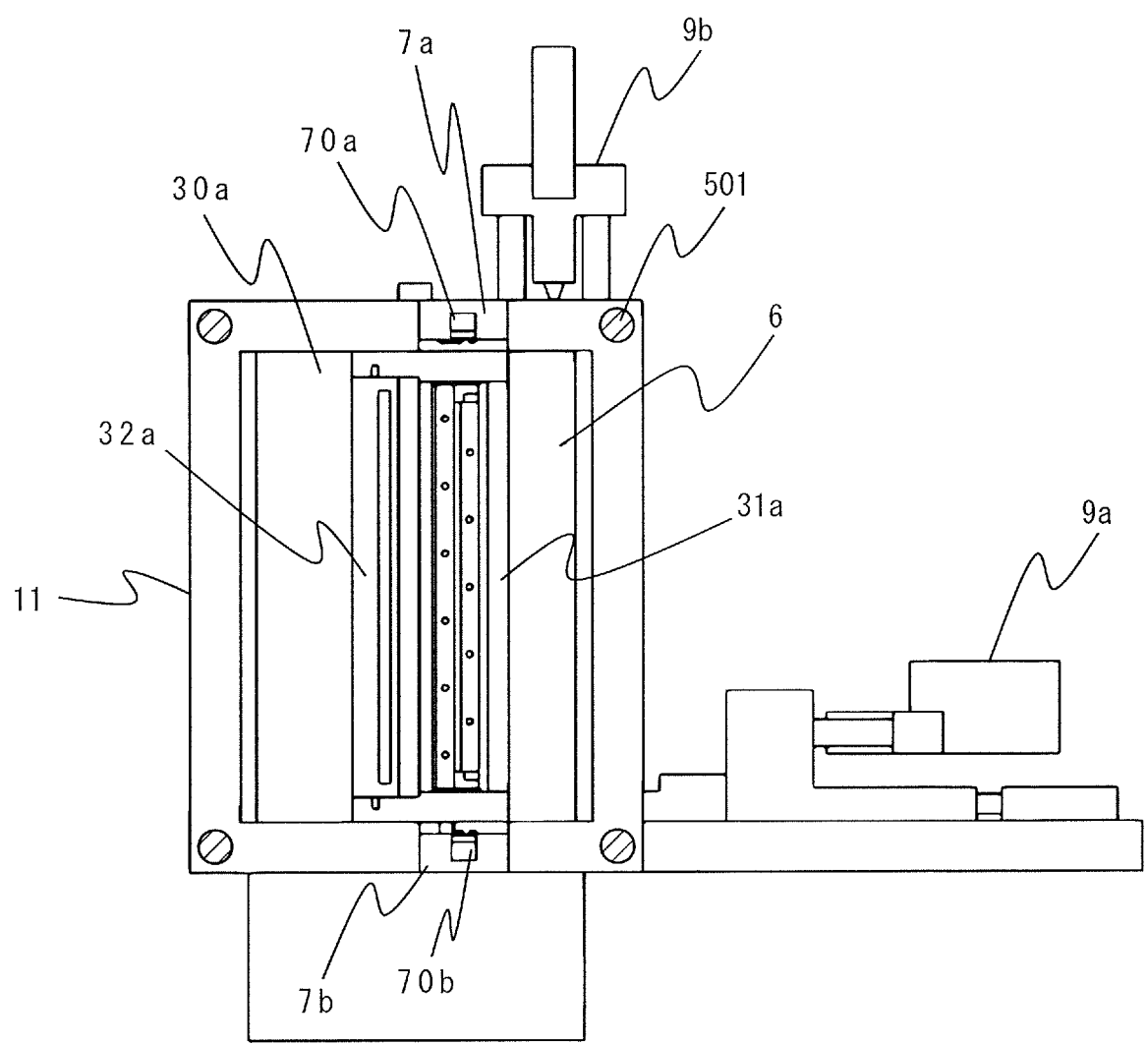
FIG. 4 is a front view of a rotatable portion illustrating a configuration of a forming surface.
Figure 36:
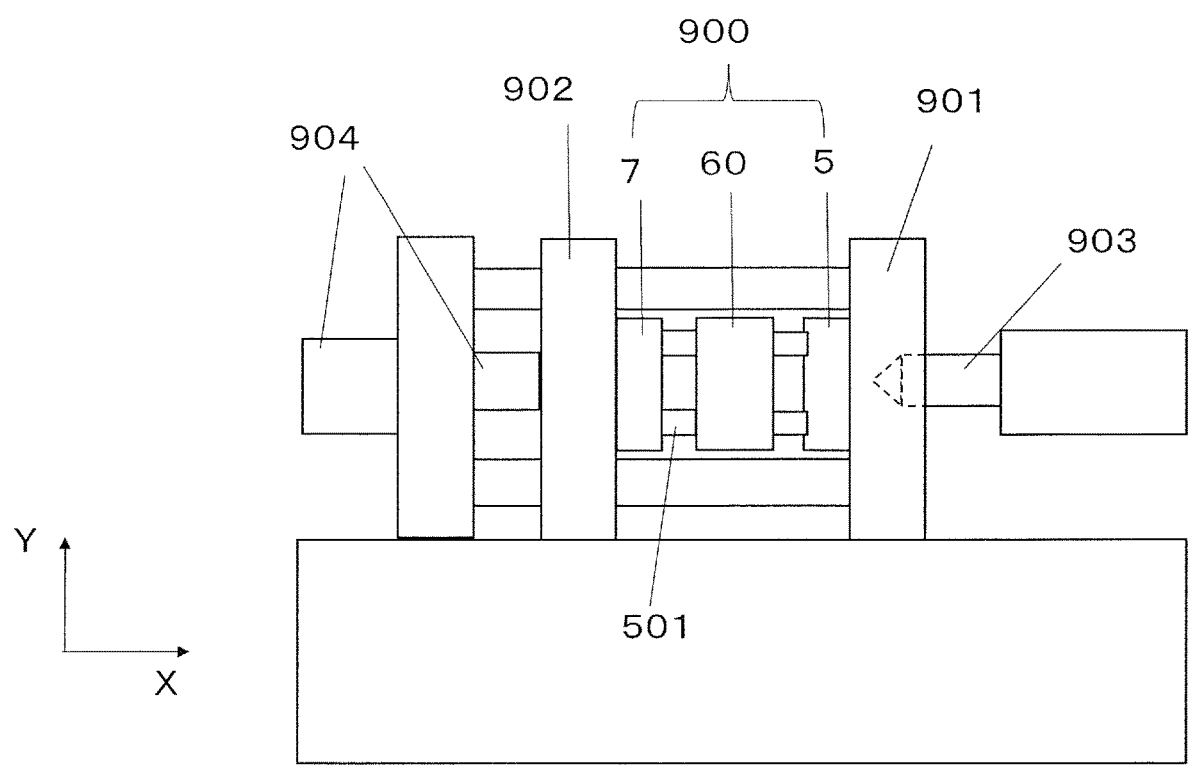
FIG. 36 is an explanatory diagram illustrating a relationship between an injection molding machine and a mold.

FIGS. 2A to 4, 20, and 36 illustrate a configuration of a mold serving as the mold of the present exemplary embodiment. FIG. 2A is a perspective view of the mold, and FIG. 2B is a top view of the mold. FIG. 3 is a front view of a fixed portion 5 viewed in an X10 direction of FIG. 2B. FIG. 4 is a front view of a first forming surface 30a of a rotatable portion 6 viewed in an X11 direction of FIG. 2B. FIG. 36 is a diagram illustrating a relationship between an injection molding machine and a mold.

As illustrated in FIGS. 2A to 4, 20, and 36, a mold 900 of the present exemplary embodiment includes a first portion 5, a second portion 7, and a third portion 60. The first portion 5 is also sometimes referred to as a fixed portion 5, and the second portion 7 is also sometimes referred to as a movable portion 7. The third portion 60 includes the rotatable portion 6 and a frame portion 11, and the rotatable portion 6 is rotatably supported by the frame portion 11. In the present description, a portion other than the rotatable portion 6 in the third portion 60 is referred to as the frame portion 11.

Further, the rotatable portion 6 includes a plurality of forming surfaces including a first forming surface 30a, a second forming surface 30b, a third forming surface 30c, and a fourth forming surface 30d. These forming surfaces are each provided with a forming portion formed thereon. The forming portion is capable of forming a molded product of the same shape. In addition, the forming portion may be formed such that a part thereof is movable. Details of this will be described later. That is, the forming surface may be formed by embedding a plurality of members serving as piece portions on each of which the forming portion is formed, and at least one of the plurality of piece portions may be movably configured. In addition, the frame portion 11 of the mold of the present exemplary embodiment includes production units, for example, production units 7a, 7b, 9a, and 10a, for performing a production process of molding and/or assembly. The respective forming portions formed on the respective forming surfaces described above are positioned at respective production process positions in the order of the production process by pivoting the rotatable portion 6 about a pivot center. Further, production of a plurality of the same parts is progressed in parallel by performing different production steps of molding and/or assembly by respectively using the first portion 5, the second portion 7, and the production units at the respective process positions. As a result of this, an excellent effect of producing a part requiring a plurality of times of injection molding and an assembly step by a configuration of a small size and weight and low cost can be achieved.

That is, as illustrated in FIGS. 2A and 2B, the mold of the present exemplary embodiment includes the first portion 5 serving as a fixed portion, the third portion 60 including the frame portion 11 and the rotatable portion 6 supported by the frame portion 11, and the second portion 7 serving as a movable portion. The fixed portion 5 is fixed to a fixed board 901 of an injection molding machine as illustrated in FIG. 36, and the rotatable portion 6 and the movable portion 7 can be moved in an X direction of opening or clamping the mold with respect to the fixed portion 5. That is, the first portion 5 defines a cavity by coming into contact with one of the plurality of surfaces of the rotatable portion 6 by clamping the mold. Further, as a result of clamping the mold, the second portion 7 comes into contact with a surface different from the surface that comes into contact with the first portion 5 among the plurality of surfaces. In the present exemplary embodiment, production of a plurality of the same parts can be progressed in parallel by attaching the mold 900 of the present exemplary embodiment to an injection molding machine generally used for forming a molded product. Specifically, the fixed portion 5 is attached to the fixed board 901 and the movable portion 7 is attached to a movable board 902 of the generally used injection molding machine. An attachment portion 901 of the fixed portion 5 is connected to an injection mechanism 903 for molten resin of the injection molding machine. The molten resin injected by the injection mechanism 903 reaches to an inlet 903a of the fixed portion 5 shown in FIG. 2A, through the attachment portion 901.

The frame portion 11 is, for example, a frame body including four strut portions as illustrated, and the rotatable portion 6 is supported to be rotatable with respect to the frame portion 11 about a pivot shaft 90 serving as a pivot center. The rotatable portion 6 can be pivoted about the pivot shaft 90 in, for example, an R direction, by a driving portion, and thus can be positioned at a specific pivot position. For example, the driving portion 12 is disposed below the frame portion 11 and includes an electric motor and a transmission mechanism.

The rotatable portion 6 includes at least two forming surfaces that can be positioned so as to face four opening portions between the four struts of the frame portion 11 by being pivoted by the driving portion 12. In the present exemplary embodiment, the rotatable portion 6 overall has a quadrangular prism shape and includes four forming surfaces each having the same forming portion. The rotatable portion 6 of the mold 900 of the present exemplary embodiment is pivotally supported by the frame portion 11 via the pivot shaft 90, and thus can be positioned with a high precision with respect to, for example, the fixed portion 5 and the movable portion 7 that relatively move with respect to the frame portion 11.

As illustrated in FIGS. 2A and 36, the mold of the present exemplary embodiment includes a plurality of guides 501 extending in the left-right direction in the figures. In this example, four guides 501 are provided. The guides 501 are fixed with respect to the first portion 5 serving as a fixed portion. In the present exemplary embodiment, the guides 501 penetrate the frame portion 11 of the third portion 60 and the second portion 7 serving as a movable portion as illustrated. The mold can be clamped and opened by controlling the positions of the frame portion 11 of the third portion 60 and the second portion 7 serving as a movable portion on the guides 501 by a driving system 904 provided in the injection molding machine. That is, the mold can be clamped and opened by relatively moving the rotatable portion 6 supported by the frame portion 11 of the third portion 60 and the first portion 5 serving as a fixed portion or relatively moving the rotatable portion 6 supported by the frame portion 11 of the third portion 60 and the second portion 7 serving as a movable portion.

To be noted, in the present exemplary embodiment, the first portion 5 serving as a fixed portion is fixed to a fixed board of the injection molding machine. However, this is for the sake of convenience, and any configuration can be employed as long as the third portion 60 and the first portion 5 serving as a fixed portion or the third portion 60 and the second portion 7 serving as a movable portion are relatively movable from each other. In addition, a configuration in which one of the first portion 5 serving as a fixed portion, the second portion 7 serving as a movable portion, and the frame portion 11 is fixed to a fixed board of the injection molding machine may be employed. In addition, a configuration in which both of the first portion 5 serving as a fixed portion and the second portion 7 serving as a movable portion move may be employed.

In the mold of the present exemplary embodiment, as illustrated in FIG. 2B, a first production process position 150a, a second production process position 150b, a third production process position 150c, and a take-out position 150d are set for the frame portion 11. The first production process position 150a corresponds to a position of a production process performed by the fixed portion 5 and first slide portions 7a and 7b. The second production process position 150b corresponds to a production process performed by an injection unit 9a. The third production process position 150c corresponds to a position of a production process performed by the movable portion 7, a driving portion 10a, and an injection unit 9b. In the present description, the first production process position is sometimes simply referred to as a first process position, the second production process position is sometimes simply referred to as a second process position, and the third production process position is sometimes simply referred to as a third process position.

In the present exemplary embodiment, the rotatable portion 6 has a prismatic shape and includes a forming portion of the same shape on each of four different surfaces thereof to be used for forming the same part 101 illustrated in FIG. 1. Therefore, by pivoting the rotatable portion 6 by the driving portion 12, the forming portions of the four surfaces of the rotatable portion 6 can be sequentially moved to the first process position 150a, the second process position 150b, the third process position 150c, and the take-out position 150d. As a result of this, a different production process of molding and/or assembly can be performed by the fixed portion 5, the movable portion 7, or the production units at each process position, and thus production of a plurality of the same parts can be progressed in parallel.

The frame portion 11 of the present exemplary embodiment is provided with the first slide portions 7a and 7b illustrated in FIG. 2A that moves in synchronization with the relative movement of the frame portion 11 and the fixed portion 5. The first slide portions 7a and 7b each include an angular pin capable of moving the first slide portion 7a or 7b by using a relative displacement between the frame portion 11 and the fixed portion 5 at the first process position 150a. Therefore, the apparatus does not require a drive source such as a motor, a solenoid, or an air cylinder, and thus can be configured at relatively low cost.

In addition, the injection unit 9a illustrated in FIG. 2B and the injection unit 9b illustrated in FIG. 2A for injection molding of the part 101 are respectively disposed on the frame portion 11 and the movable portion 7. These injection units 9a and 9b are respectively used at the second process position 150b and the third process position 150c. According to such a configuration, the size and weight of the entirety of a production apparatus can be reduced as compared with a conventional configuration disclosed in, for example, Japanese Patent Laid-Open No. 2011-56774. In the present exemplary embodiment, as illustrated in FIG. 2B, a direction in which the fixed portion 5 and the movable portion 7 are opened and closed is set as a direction of an X axis, and a direction perpendicular to this direction of the X axis is set as a direction of a Y axis.

In addition, as will be described later, at the third process position 150c, driving portions 10a and 10b illustrated in FIGS. 14A to 15C that invert and move a formed member 2 and a piece portion 32a thereof on forming surfaces 30a to 30d are disposed in the frame portion 11. These driving portions 10a and 10b are respectively driven by movement portions 110b and 110c each including, for example, an air cylinder and an angular pin. The configurations and operations of the driving portions 10a and 10b will be described later in detail.

The fixed portion 5 includes forming portions 21 and 22 for respectively forming formed members 1 and 2 illustrated in FIG. 1 constituting the part 101 as illustrated in FIG. 3.

The rotatable portion 6 of the present exemplary embodiment has an approximately quadrangular prism shape and has four forming surfaces therearound. FIG. 4 illustrates the forming surface 30a, which is one of the forming surfaces of the rotatable portion 6, as viewed from the right in FIGS. 2A and 2B. The forming surface 30a and the other three forming surfaces 30b to 30d of the rotatable portion illustrated in, for example, FIG. 20, all have the same configuration, and constitute forming portions of the same shape used for molding the same parts. That is, the rotatable portion 6 of the present exemplary embodiment is constituted by disposing a forming portion of the same shape used for molding the same part on each of a plurality of different surfaces disposed around a pivot center. Although the configuration of the forming surface 30a of the rotatable portion 6 will be mainly described below, the same applies to the configurations of the other forming surfaces 30b to 30d.

In the present exemplary embodiment, an example in which the mold takes four positions including process positions and a take-out position is shown, and thus forming portions of the same shape are formed on all of the four surfaces of the rotatable portion 6. However, the configuration is not limited to this. For example, in the case where only three positions including process positions and a take-out position are set, forming portions of the same shape may be formed on three surfaces. In addition, in the case where only two positions including a process position and a take-out position are set, forming portions of the same shape may be formed on two surfaces.

Piece portions 31a and 32a for respectively forming the formed members 1 and 2 illustrated in FIG. 1 constituting the part 101 are provided on the forming surface 30a of the rotatable portion 6 as first and second forming portions.

Figure 20:
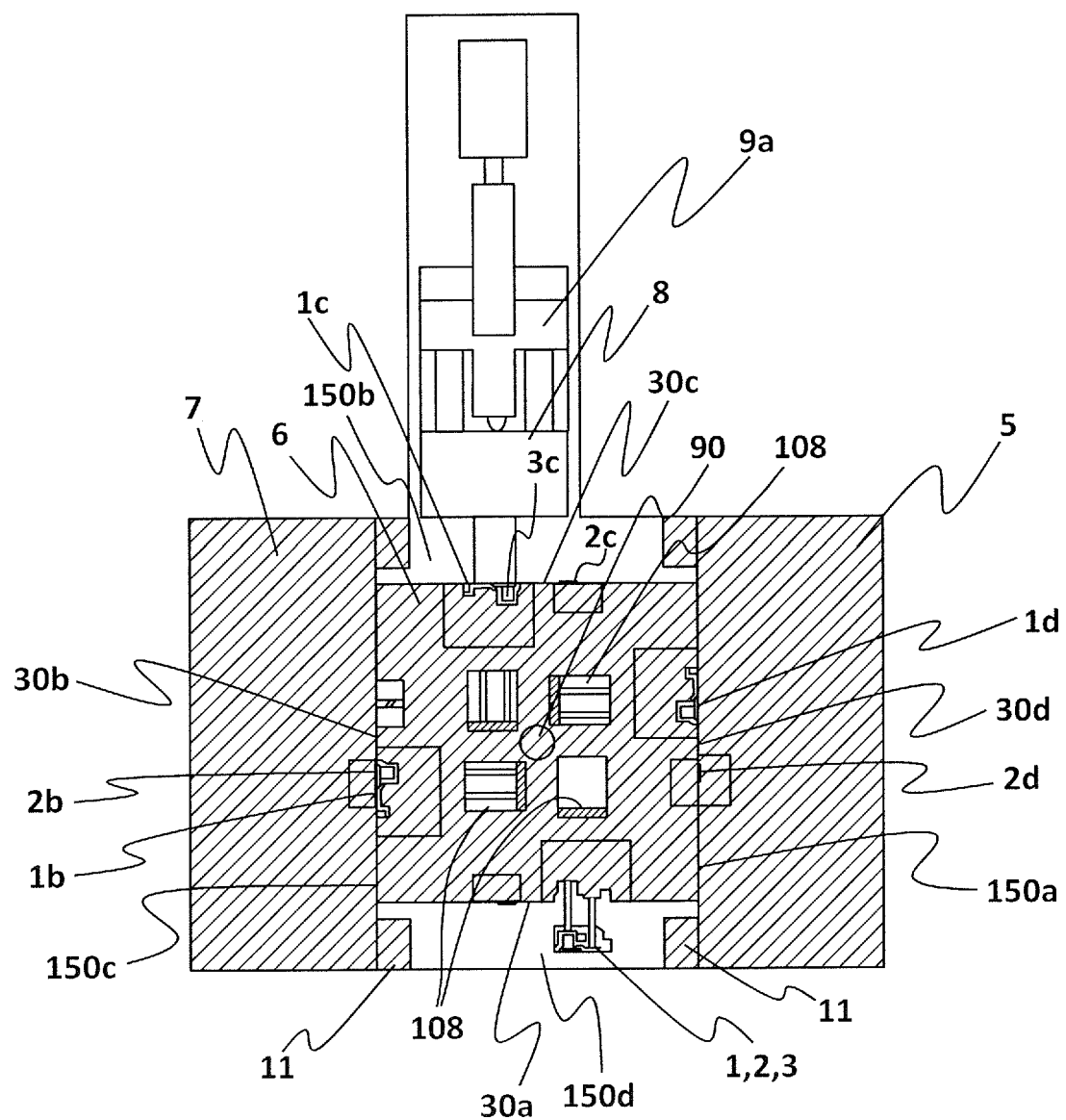
FIG. 20 is a section view of the mold illustrating a state in which molding and assembly are performed by using four forming surfaces of the rotatable portion.

Here, for example, the forming surface 30a, which is one of the forming surfaces of the rotatable portion 6, is moved to the first process position 150a by pivoting the rotatable portion 6. At this time, the piece portions 31a and 32a are positioned so as to respectively oppose the forming portions 21 and 22 of the fixed portion 5. Further, in the case where the rotatable portion 6 is pivoted in the R direction by 90°, the second forming surface 30b illustrated in FIG. 2A is moved to a forming position opposing the first forming portions 21 and 22 of the fixed portion 5 as illustrated in FIG. 20. In addition, as a result of the 90° rotation of the rotatable portion 6, the forming surface 30a advances to the second process position 150b.

As shown below, similarly, by rotating the rotatable portion 6 by 90° each time, the forming surfaces 30a to 30d can be sequentially moved to the first process position 150a, the second process position 150b, the third process position 150c, and the take-out position 150d.

Next, a production procedure of the part 101 of the present exemplary embodiment will be described. In addition, a more detailed configuration of the mold will be also described below. In the present exemplary embodiment, the formed members 1, 2, and 3 and the joint member 4 constituting the part 101 of FIG. 1 are formed through first to sixth steps. Among the first to sixth steps, some adjacent steps are performed at the same process position.

Figure 5:
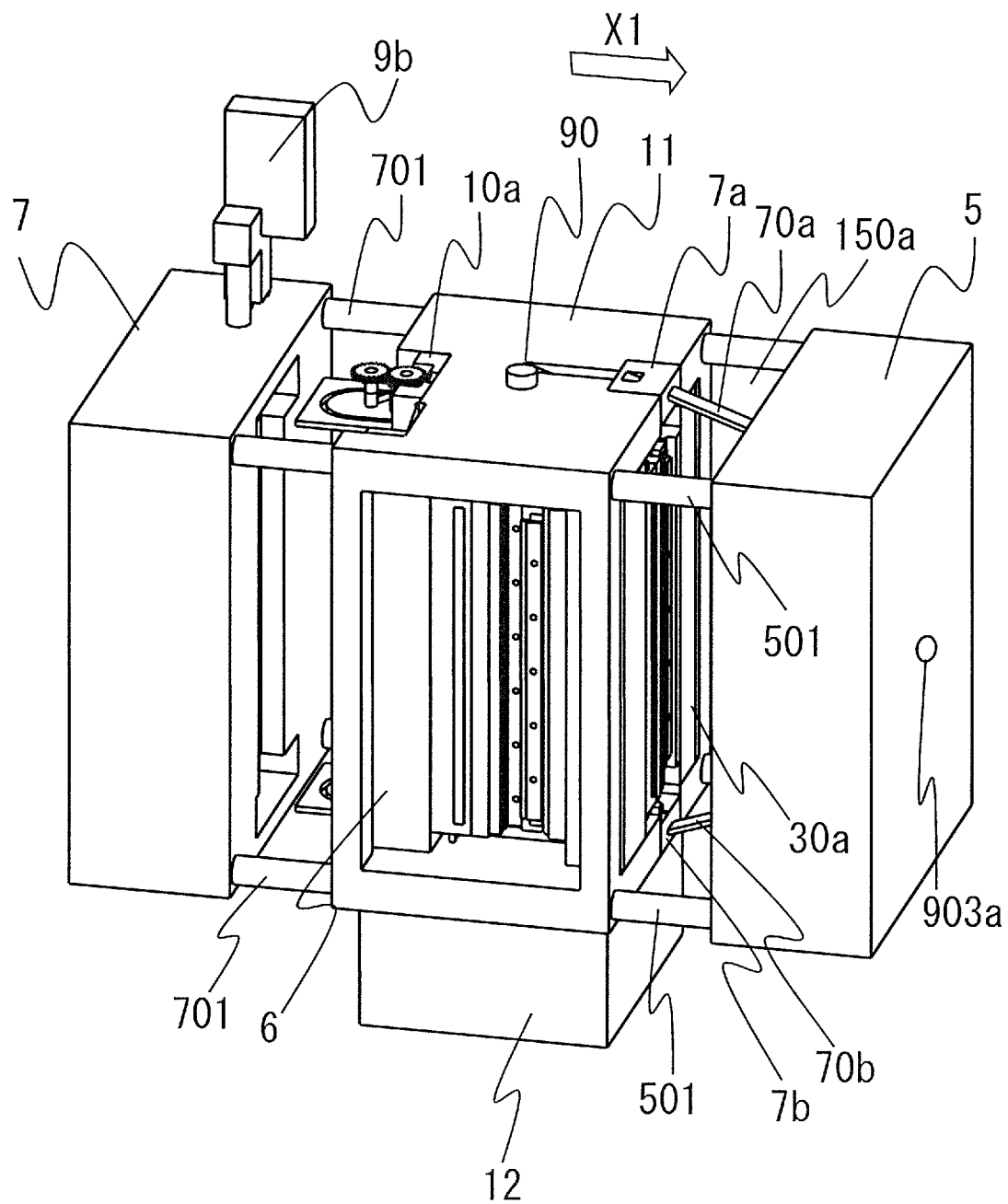
FIG. 5 is an explanatory diagram illustrating an operation of closing the mold.

The first step is shown in FIGS. 2 and 5 to 7. In the first step indicated by K1 in FIG. 2B, first, as illustrated in FIG. 5, the rotatable portion 6 is pivoted about the pivot shaft 90 of the rotatable portion 6 such that the first forming surface 30a is positioned at the first process position 150a defined by the fixed portion 5. Then, the fixed portion 5 and the rotatable portion 6 are closed by relatively moving the fixed portion 5 and the rotatable portion 6. To be noted, in FIG. 5, a direction in which the rotatable portion 6 approaches the fixed portion 5 is indicated by an arrow X1.

Figure 6A:
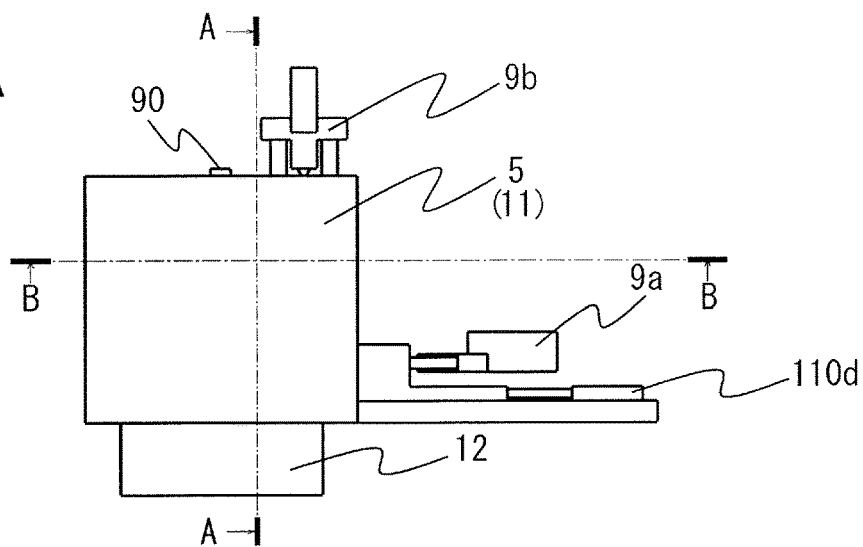
FIGS. 6A to 6C illustrate a state in which the mold is closed at a first process position, FIG. 6A being a side view of the mold, FIG. 6B being a longitudinal section view of the mold taken along an A-A line of FIG. 6A, FIG. 6C being a cross-section view of the mold taken along a B-B line of FIG. 6A.
Figure 6B:
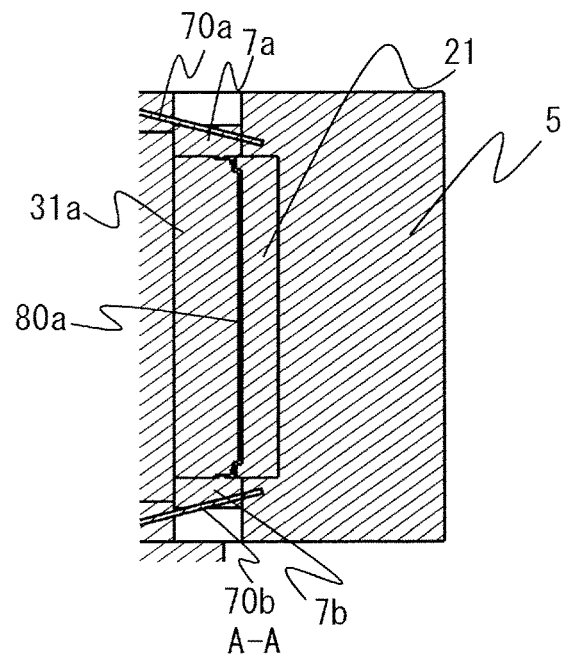

As illustrated in FIGS. 4, 5, and 6B, inclined angular pins 70a and 70b are implanted inside the fixed portion 5. These angular pins 70a and 70b penetrate through the first slide portions 7a and 7b. The first slide portions 7a and 7b are supported so as to be slidable in the vertical direction in FIGS. 5 and 6B with respect to the frame portion 11. Therefore, in the case where the rotatable portion 6 relatively moves in the X1 direction with respect to the fixed portion 5 for clamping the mold, the first slide portions 7a and 7b respectively linearly move downward and upward.

Figure 6C:
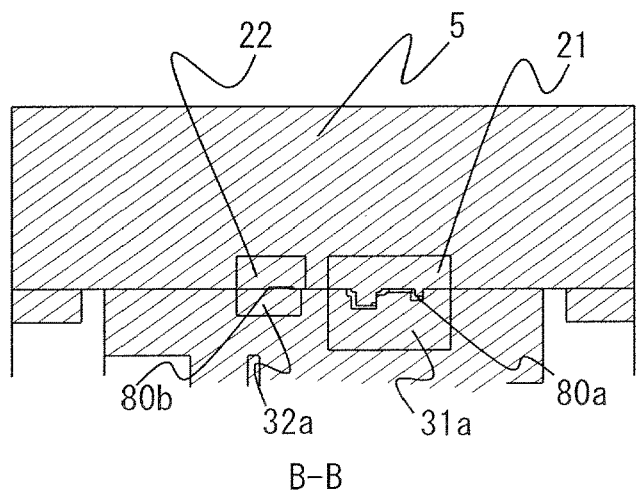

FIGS. 6B and 6C illustrate a state in which the fixed portion 5 is clamped. In this clamped state, the first slide portions 7a and 7b move along the angular pins 70a and 70b and seal the top and bottom of the cavity 80a defined by the forming portion 21 of the fixed portion 5 and the piece portion 31a of the rotatable portion 6. That is, as a result of the movement, the first slide portions 7a and 7b come into contact with at least one of the fixed portion 5 and the rotatable portion 6. As a result of this, the cavity 80a is defined. According to such a configuration, injection molding can be performed even for a molded product having a relatively complex structure on end portions thereof such as the formed member 1 of the part 101 illustrated in FIG. 1.

Figure 7A:
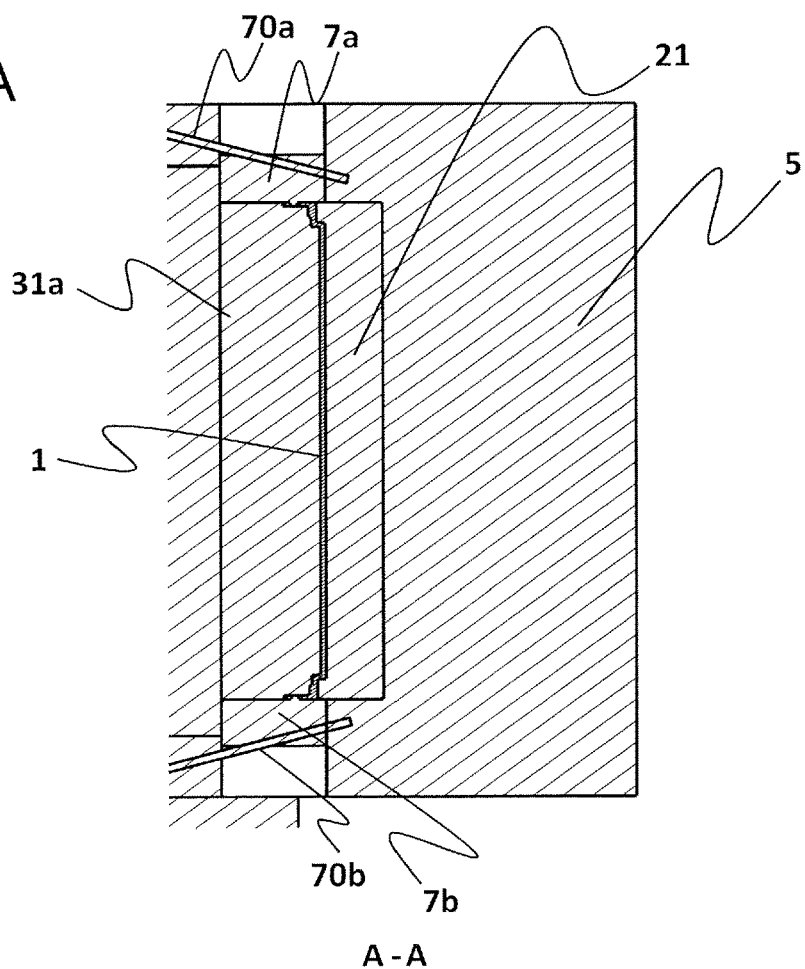
FIGS. 7A and 7B illustrate a state in which a molded product is formed in the state of FIG. 6, FIG. 7A being a longitudinal section view of the mold of FIG. 6A taken along the A-A line, FIG. 7B being a cross-section view of the mold of FIG. 6B taken along the B-B line.
Figure 7B:
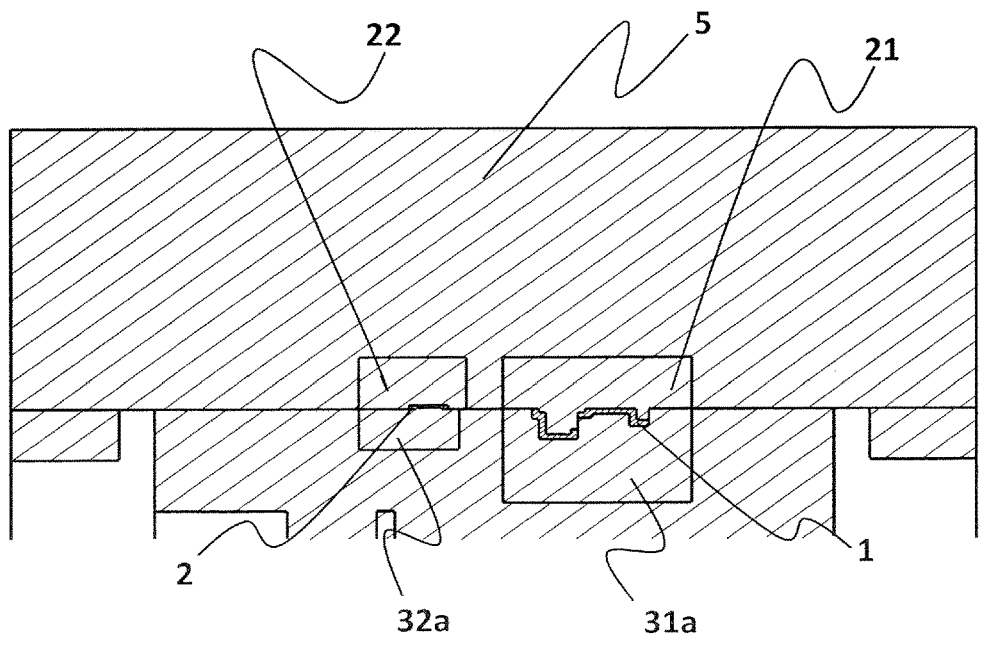

Subsequently, as illustrated in FIGS. 6B and 6C, a plurality of cavities 80a and 80b are defined by the first forming portions 21 and 22 of the fixed portion 5, the piece portions 31a and 32a of the rotatable portion 6, and the first slide portions 7a and 7b. Then, molten resin is injected from the injection molding machine into the cavities 80a and 80b that in the molds. According to this, the formed members 1 and 2 are formed by injection molding as illustrated in FIGS. 7A and 7B. To be noted, the format of illustration of FIGS. 7A and 7B is the same as FIGS. 6B and 6C. The injection of molten resin in the first step is performed by, for example, an unillustrated injection molding machine attached to the fixed portion 5. In addition, illustration of flow paths of the resin such as a runner and a gate in the fixed portion 5 is omitted in the present exemplary embodiment, and the configuration of the flow paths of the resin does not constitute the present invention and can be arbitrarily modified by one skilled in the art.

Figure 8:
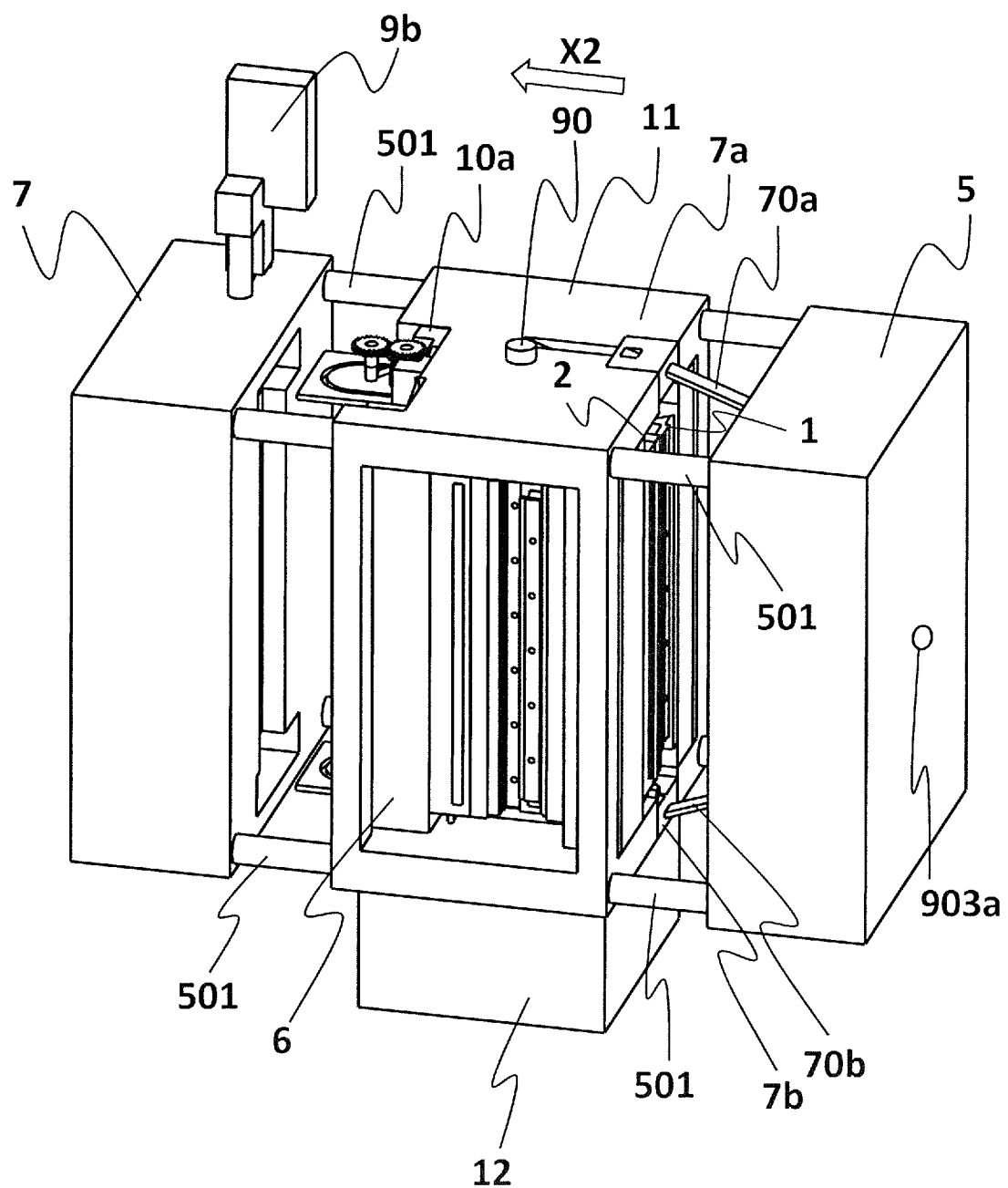
FIG. 8 is a perspective view of the mold in an open state.
Figure 9:
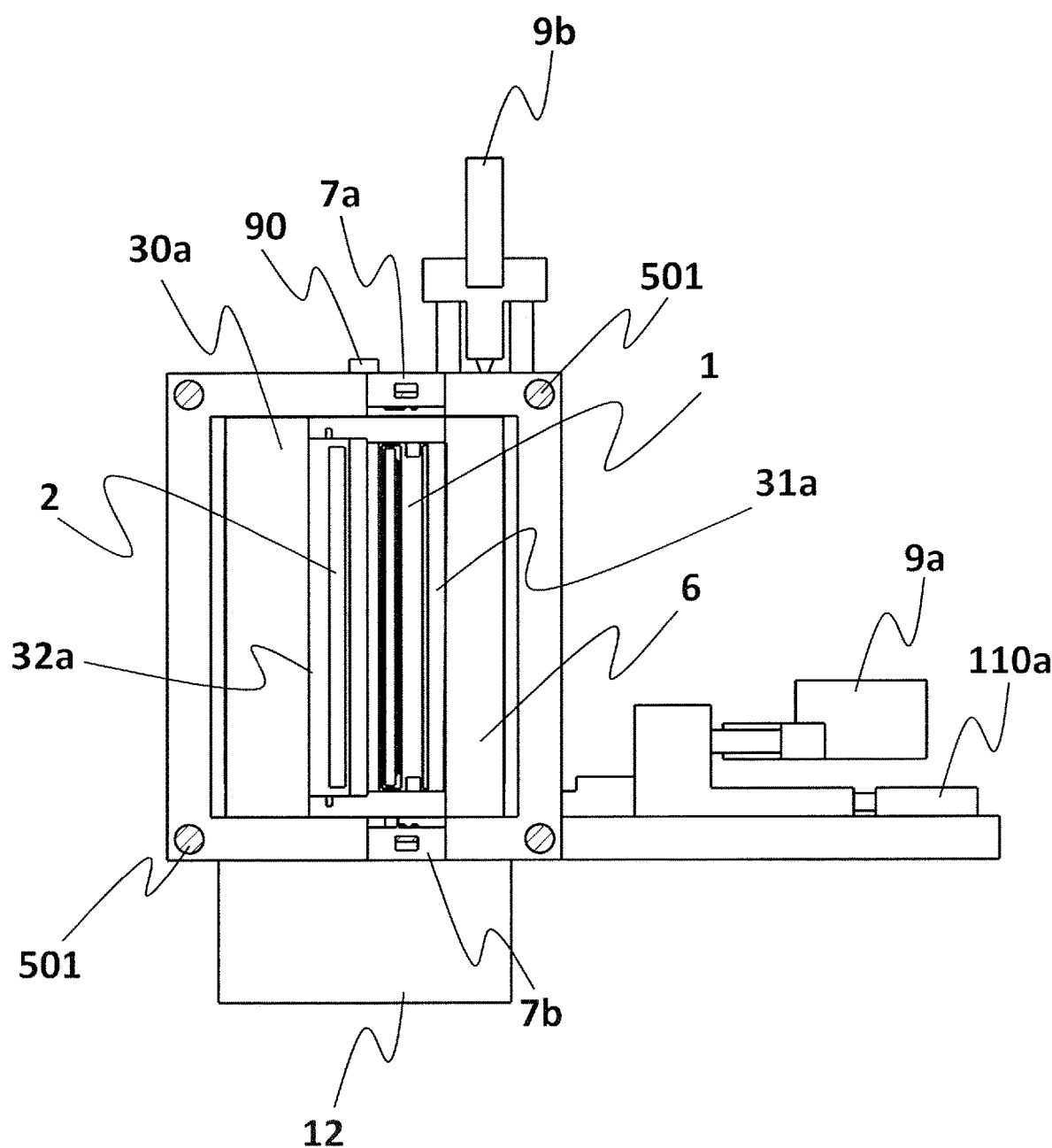
FIG. 9 is a side view of the mold illustrating a state in which a formed member is held by a second forming portion.

Next, the second step will be described with reference to FIGS. 2A, 2B, 8, and 9. FIG. 8 illustrates a state in which the fixed portion 5 and the frame portion 11 supporting the rotatable portion 6 are opened. FIG. 9 illustrates a state in which the formed members 1 and 2 that have been formed are held by the piece portions 31a and 32a.

In this second step indicated by K2 in FIG. 2B, as illustrated in FIG. 8, the mold is opened by moving the movable portion 7 and the frame portion 11 supporting the rotatable portion 6 in an X2 direction away from the fixed portion 5. At this time, the first slide portions 7a and 7b move in a direction to move away from the piece portion 31a of the rotatable portion 6 along the angular pins 70a and 70b contrary to the case of clamping the mold. In addition, by opening the fixed portion 5 and the frame portion 11 supporting the rotatable portion 6, the formed members 1 and 2 that have been formed are released from the first forming portions 21 and 22 of the fixed portion 5, and are respectively held by the piece portions 31a and 32a of the rotatable portion 6 as illustrated in FIG. 9.

Figure 10:
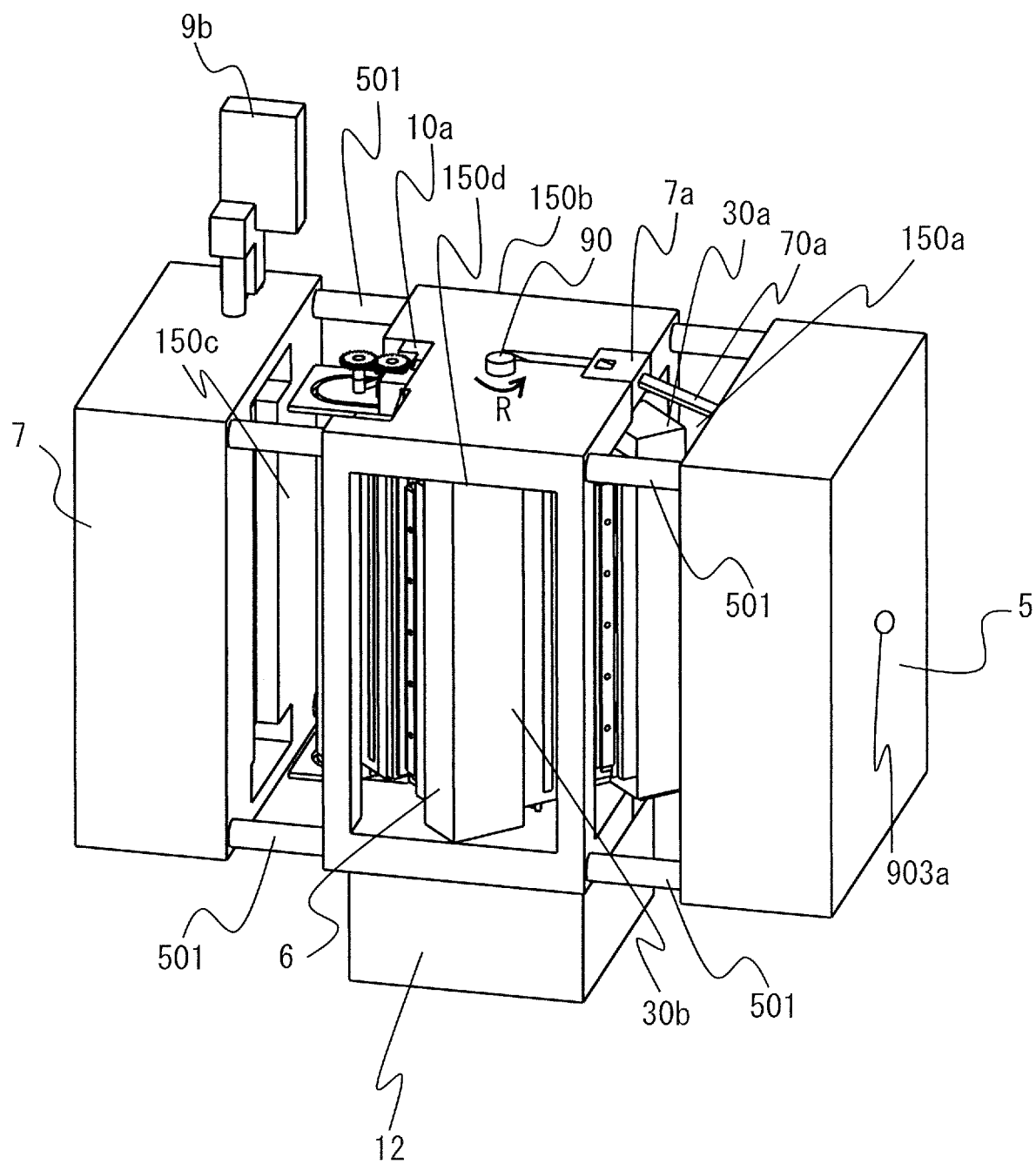
FIG. 10 is a perspective view of the mold illustrating a state in which the rotatable portion is rotated.

Next, the third step will be described with reference to FIGS. 2A, 2B, 10, 11, 12A, and 12B. FIG. 10 illustrates a state in which the rotatable portion 6 is being pivoted so as to move the forming surface 30a to the second process position 150b and move the forming surface 30b to the first process position 150a.

Figure 11:
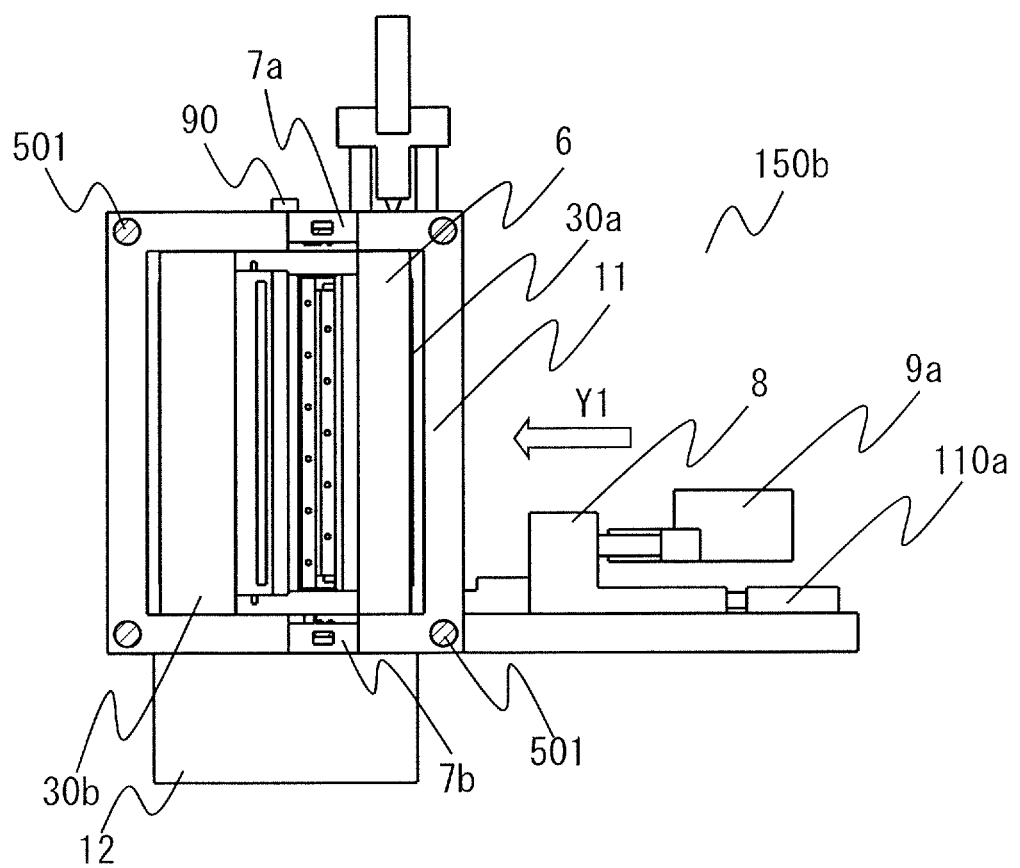
FIG. 11 is a side view of the mold illustrating a state in which a second slide portion operates at a second process position.

FIG. 11 illustrates a state after the pivoting described above has been completed, that is, a state in which the operation of moving the forming surface 30b of the rotatable portion 6 to the first process position 150a and moving the forming surface 30a to the second process position 150b has been completed. This FIG. 11 corresponds to, for example, a side view of the rotatable portion 6, a second slide portion 8, and the injection unit 9a as viewed from the right in FIG. 10.

As illustrated in FIG. 11, at the second process position 150b, the second slide portion 8 and the injection unit 9a attached thereto are relatively moved in a Y1 direction with respect to the forming surface 30a of the rotatable portion 6 by a movement portion 110a. This movement portion 110a can be constituted by, for example, an air cylinder.

Figure 12A:
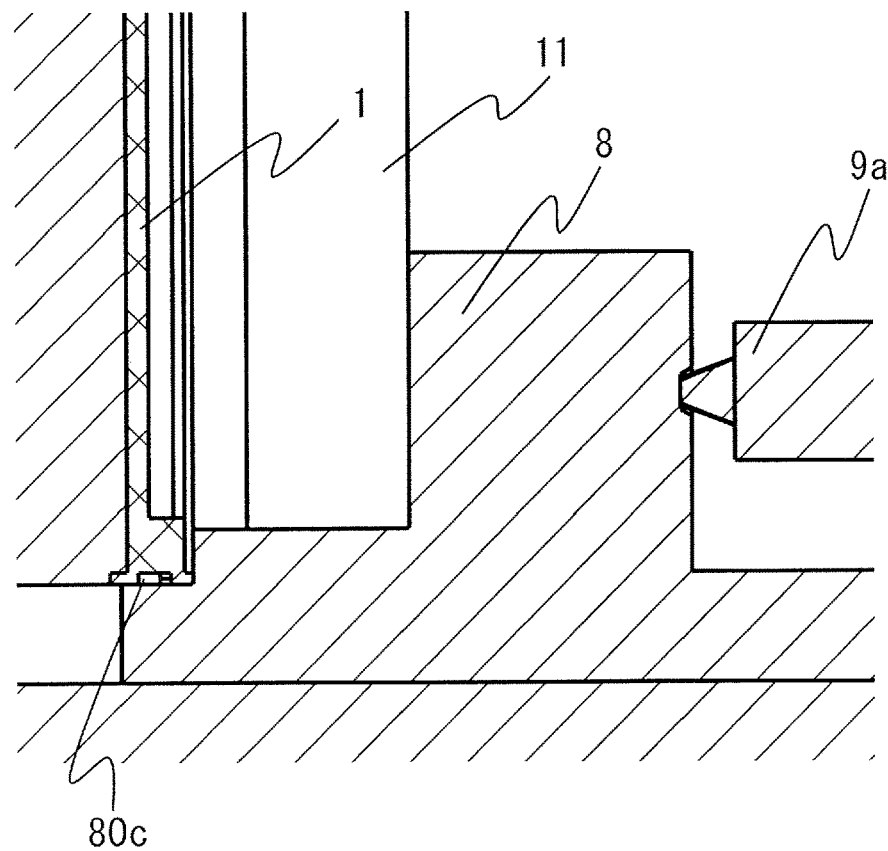
FIGS. 12A and 12B respectively show a section view of the mold and illustrate a state in which resin is molded at the second process position of FIG. 11 in detail.

FIG. 12A illustrates a longitudinal section view of the mold in a state in which the second slide portion 8 is clamped afterwards with respect to the piece portion 31a and the formed member 1 held by the piece portion 31a constituting the forming surface 30a of the rotatable portion 6. In addition, FIG. 12B corresponds to a section view of the mold at the time of performing injection molding by injecting molten resin by the injection unit 9a into a cavity defined by the forming surface 30a of the rotatable portion 6 and the second slide portion 8 at the second process position 150b.

In the third step indicated by K2 in FIG. 2B, as illustrated in FIG. 10, the rotatable portion 6 is rotated in the R direction by 90° about the pivot shaft 90 with respect to the driving portion 12, and thus the first forming surface 30a is moved to the second process position 150b. According to this, the second forming surface 30b moves to the first process position 150a.

Next, as illustrated in FIG. 11, the second slide portion 8 disposed in the frame portion 11 and the injection unit 9a are moved in the Y1 direction toward the rotatable portion 6 by the movement portion 110a. As a result of this, the second slide portion 8 is clamped with respect to the formed member 1 held by the piece portion 31a as illustrated in FIG. 12A. To be noted, the second slide portion 8 may be configured to come into contact with only the piece portion 31a or both the formed member 1 and the piece portion 31a, or also with the rotatable portion 6. Such details of the configuration may be appropriately modified in accordance with the shape of the formed member 3 formed in this step.

Figure 12B:
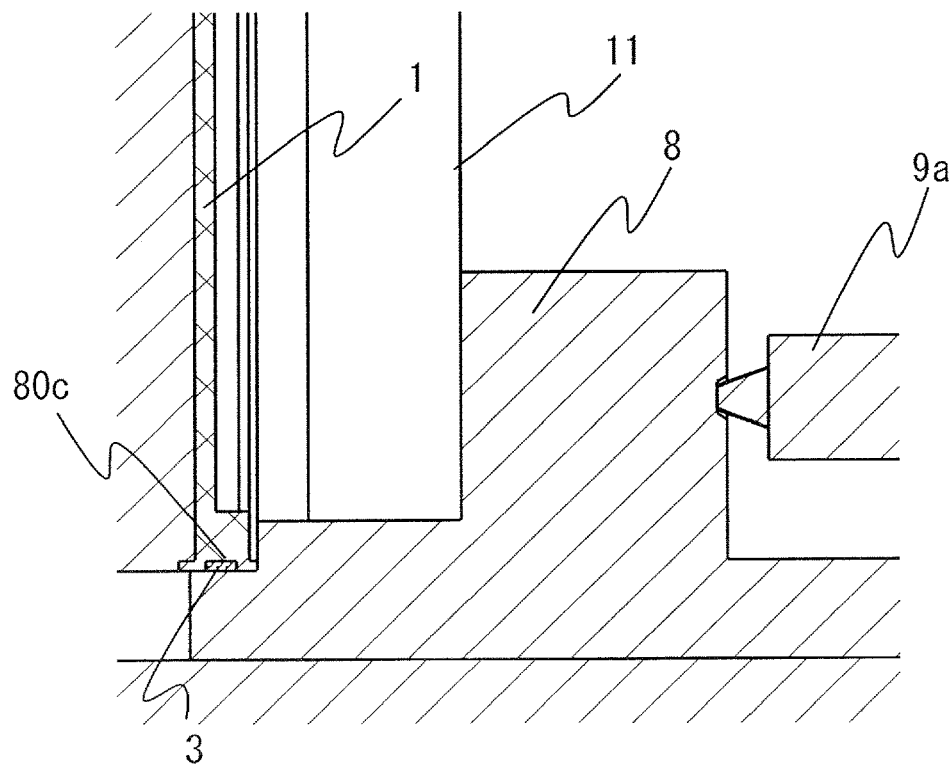

Next, as illustrated in FIGS. 12A and 12B, molten resin is injected by the injection unit 9a into a cavity 80C defined by the second slide portion 8 and the formed member 1, and thus the formed member 3 is formed on the formed member 1. To be noted, illustration of the configuration of flow paths of resin such as a runner is also omitted herein. As described above, in the present exemplary embodiment, the formed member 3 is directly formed, by the second slide portion 8 and the injection unit 9a provided to the frame portion 11 supporting the rotatable portion 6, integrally with the formed member 1 held by the rotatable portion 6. With such a configuration, the formed member 3 can be formed with a high precision.

Figure 13:
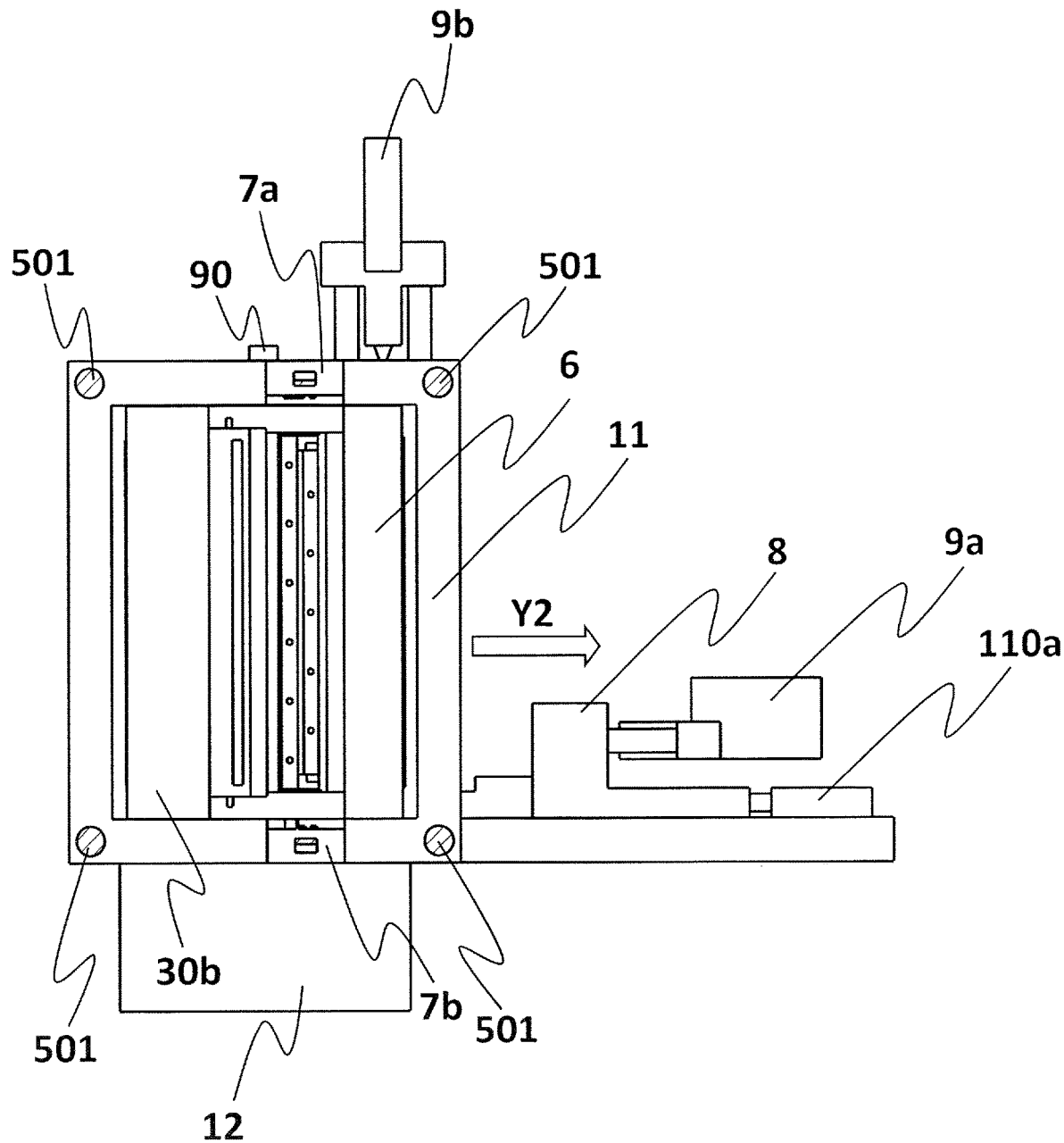
FIG. 13 is a side view of the mold illustrating a state in which the second slide portion is separated from the rotatable surface.
Figure 14A:
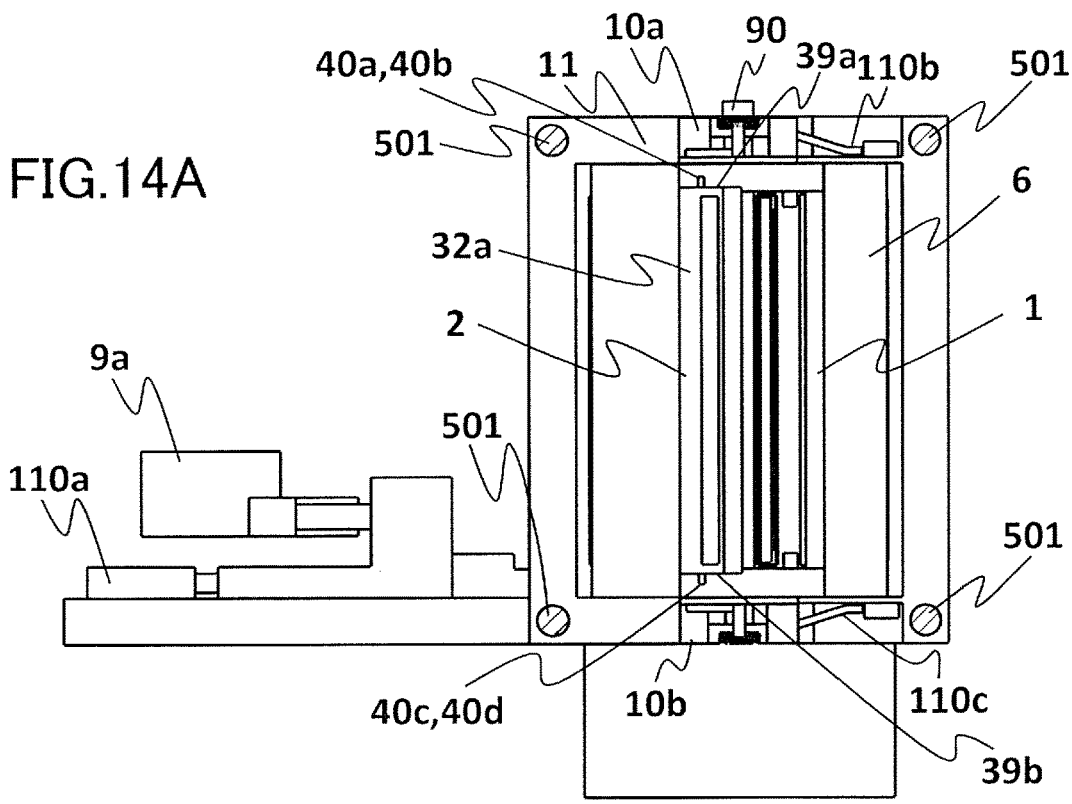
FIG. 14A is a side view of the mold illustrating an operation of a driving portion at a third process position.
Figure 14B:
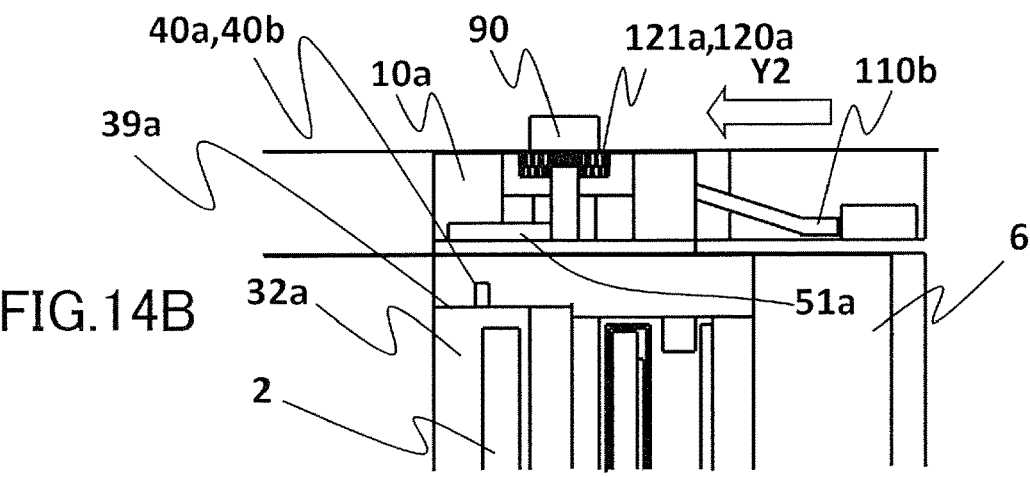
FIGS. 14B and 14C are each an enlarged side view of a part of FIG. 14A.
Figure 14C:
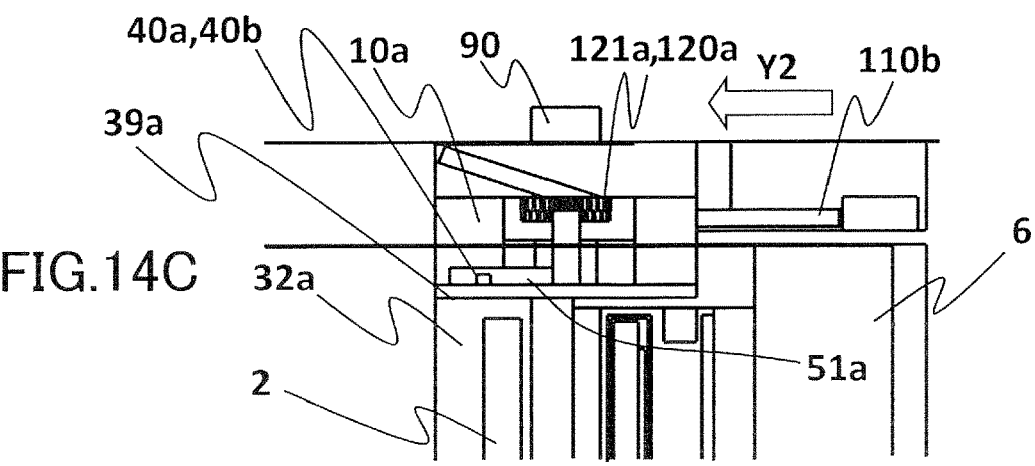
Figure 15A:
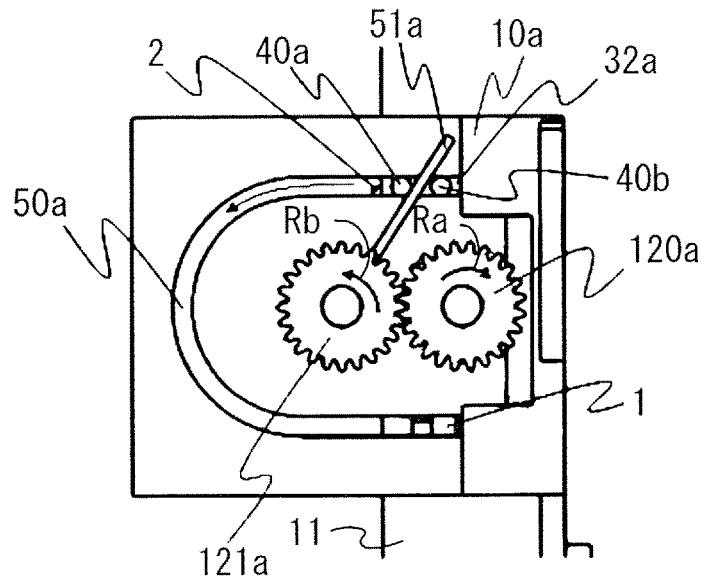
FIGS. 15A to 15C respectively illustrate a top view of the driving portion illustrating how a mold piece is inverted and moved by the operation of FIGS. 14A to 14C.
Figure 15B:
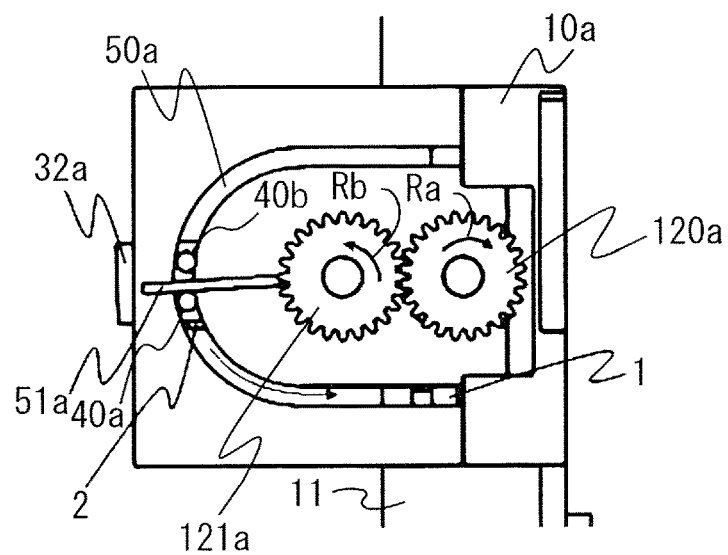
Figure 15C:
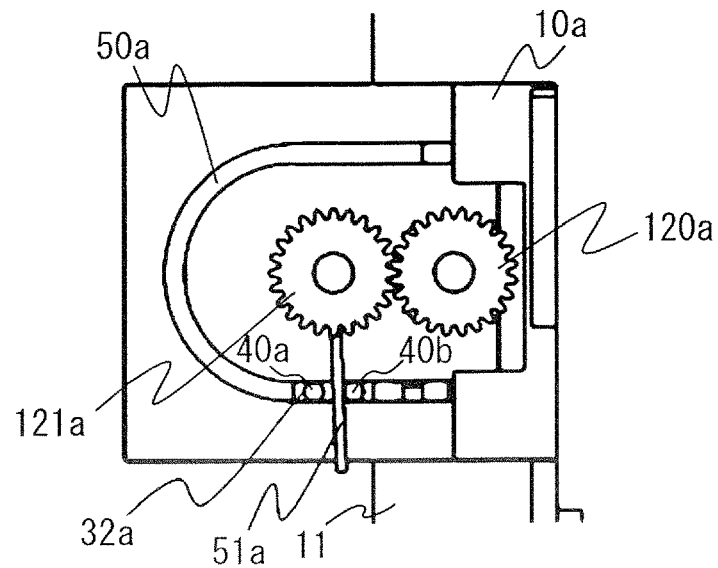

Next, the fourth step will be described with reference to FIGS. 2A, 2B, 5, 10, and 13 to 17. FIG. 13 illustrates a state in which the second slide portion 8 is separated from the rotatable portion 6. FIGS. 14A to 14C illustrate an operation of the driving portion 10a. FIGS. 15A to 15C illustrate a state in which the piece portion 32a is inverted and moved by the driving portion 10a. In addition, FIG. 16 illustrates how the joint member 4 is formed. Further, FIG. 17 illustrates a modification example in which the frame portion 11a is provided with an injection unit 9c.

In the fourth step indicated by K3 in FIG. 2B, as illustrated in FIG. 13, the second slide portion 8 is moved in a direction Y2, away from the rotatable portion 6. Then, in a state in which the formed member 1 on which the formed member 3 has been formed and the formed member 2 are respectively held by the rotatable portion 6, and the rotatable portion 6 is rotated in the R direction by 90° about the pivot shaft 90 as illustrated in FIG. 10 and is thus moved to the third process position 150c illustrated in FIG. 2B.

FIGS. 14A to 14C illustrate the rotatable portion 6, the second slide portion 8, and the injection unit 9a as viewed in a direction opposite to FIG. 13, for example, from the left in FIG. 10.

As illustrated in FIG. 14A, at the third process position 150c illustrated in FIG. 2B, driving portions 10a and 10b are respectively disposed at top and bottom end portions of the frame portion 11. The driving portions 10a and 10b have equivalent configurations although the orientations of main components thereof are vertically inverted.

In the present exemplary embodiment, movement portions 110b and 110c are each constituted by an air cylinder and an angular pin. By using these movement portions 110b and 110c, the driving portions 10a and 10b supported by the frame portion 11 can be respectively moved downward and upward. That is, by moving the movement portions 110b and 110c in the Y2 direction, the driving portions 10a and 10b can be moved closer to end surfaces 39a and 39b of the piece portion 32a by which the formed member 2 is held and thus can be brought into contact with the piece portion 32a as illustrated in FIGS. 14B and 14C.

Meanwhile, the piece portion 32a holding the formed member 2 is provided with shafts 40a and 40b at the end surface 39a that comes into contact with the driving portion 10a as illustrated in FIGS. 14A to 14C and 15A to 15C. In addition, the end surface 39b that comes into contact with the driving portion 10b is provided with shafts 40c and 40d as illustrated in FIG. 14A. According to such a configuration, the piece portion 32a can be inverted and moved by the driving portions 10a and 10b, and thus the formed member 2 can be engaged with the formed member 1 supported by the piece portion 31a.

That is, when the driving portions 10a and 10b are respectively moved downward and upward by the movement portions 110b and 110c, the shafts 40a and 40b that are implanted in top and bottom end surfaces of the piece portion 32a engage with a groove 50a of a guide portion included in the driving portion 10a as illustrated in FIG. 15A. As illustrated in FIGS. 15A to 15C, the U-shaped groove 50a constituting the guide portion is defined in a flat plate portion of the driving portion 10a. In addition, gears 120a and 121a that engage with each other are provided within the U-shape of the groove 50a, and, for example, the gear 120a is driven by a rotation driving portion such as an electric motor whose details are not illustrated. In addition, a lever 51a is fixed to a pivot shaft of the gear 121a as illustrated in FIGS. 14B and 14C.

As illustrated in FIGS. 15A to 15C, in the case where the gear 120a is rotated in an arrow Ra direction in a state in which the shafts 40a and 40b are engaged with the groove 50a of the guide portion, the gear 121a rotates in an arrow Rb direction. Then, in accordance with the rotation of the gear 121a, the lever 51a is rotationally displaced as illustrated in FIGS. 15A to 15C, and moves the shaft 40a of the piece portion 32a along the U-shaped groove 50a.

That is, the lever 51a comes into contact with the shaft 40a and moves the shafts 40a and 40b along the groove 50a of the guide portion. The piece portion 32a is configured to be separable from the rotatable portion 6, and can be inverted, that is, flipped over by 180°, and moved toward the formed member 1 as illustrated in FIGS. 15B and 15C.

As described above, by inverting and moving the formed member 2 with the piece portion 32a, the formed member 2 can be assembled with, in other words, mounted on the formed member 1. To be noted, appropriate engagement portions such as engagement claws and grooves may be provided between the formed members 1 and 2 whose details are not illustrated, and the mutual positioning of the formed member 1 and 2 may be performed by pushing the formed member 2 by the driving portions 10a and 10b.

Then, the movable portion 7 is moved in the X1 direction illustrated in FIG. 5, that is, toward the rotatable portion 6 and the frame portion 11, and thus the movable portion 7 and the rotatable portion 6 are closed. Then, molten resin is injected by the injection unit 9b to form the joint member 4 of FIG. 1, and thus the formed member 2 and 1 are joined.

Figure 16A:
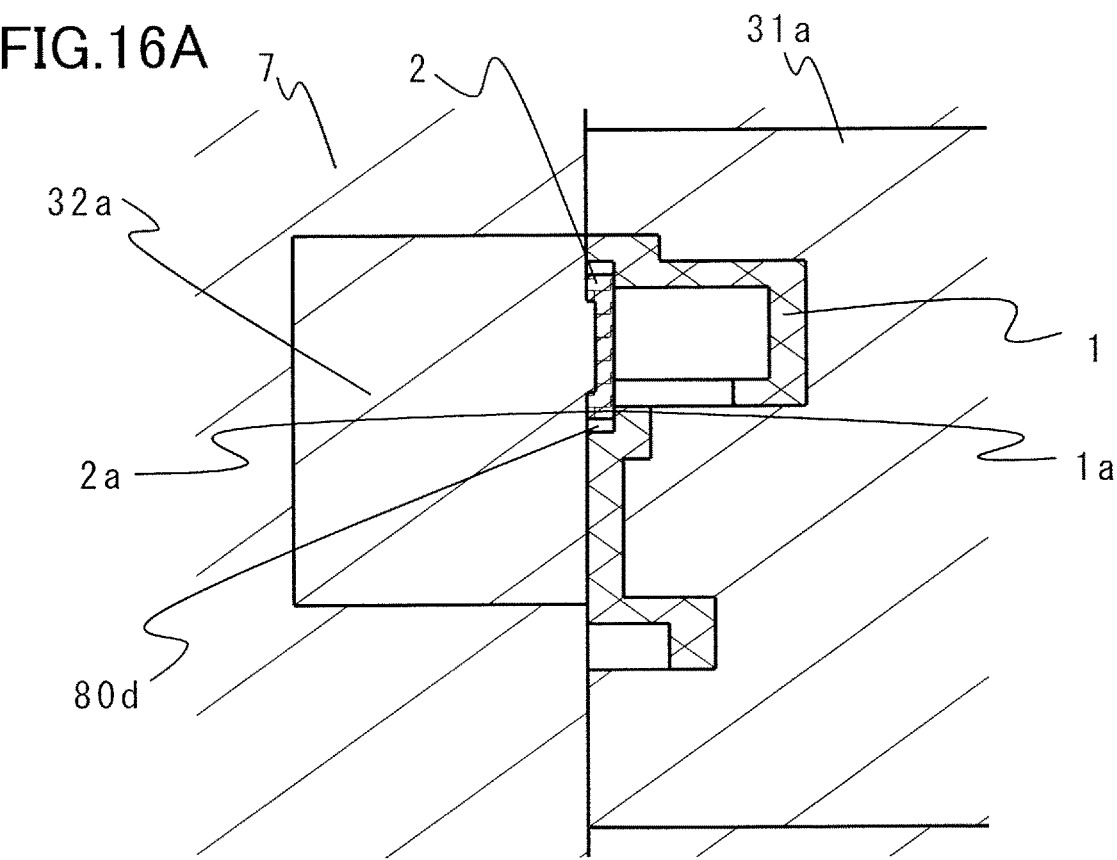
FIGS. 16A and 16B respectively illustrate a section view of the mold illustrating a state in which resin is molded at the third process position.
Figure 17:
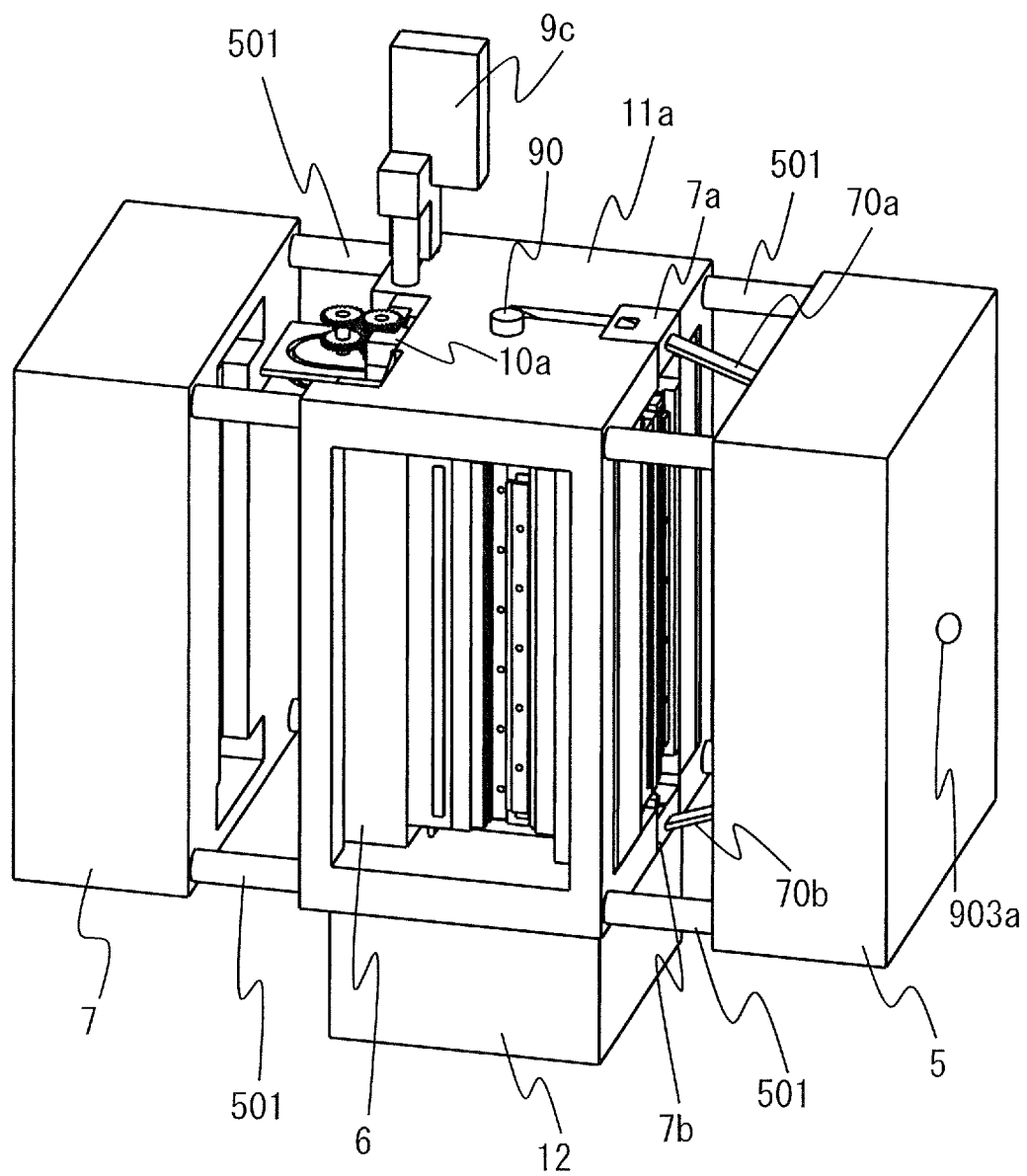
FIG. 17 is a perspective view of the mold illustrating a different configuration in which an injection unit is provided on a frame body.

That is, in the case where the piece portion 32a is inverted and the formed member 2 is mounted on the formed member 1 as illustrated in FIGS. 15A to 15C, the section is as illustrated in FIG. 16A. In the case where the movable portion 7 and the rotatable portion 6 are closed at this time, the movable portion 7 presses the piece portion 32a, and thus opposing surfaces 1a and 2a of the formed members 1 and 2 are brought into firm contact as illustrated in FIG. 16A.

Figure 16B:
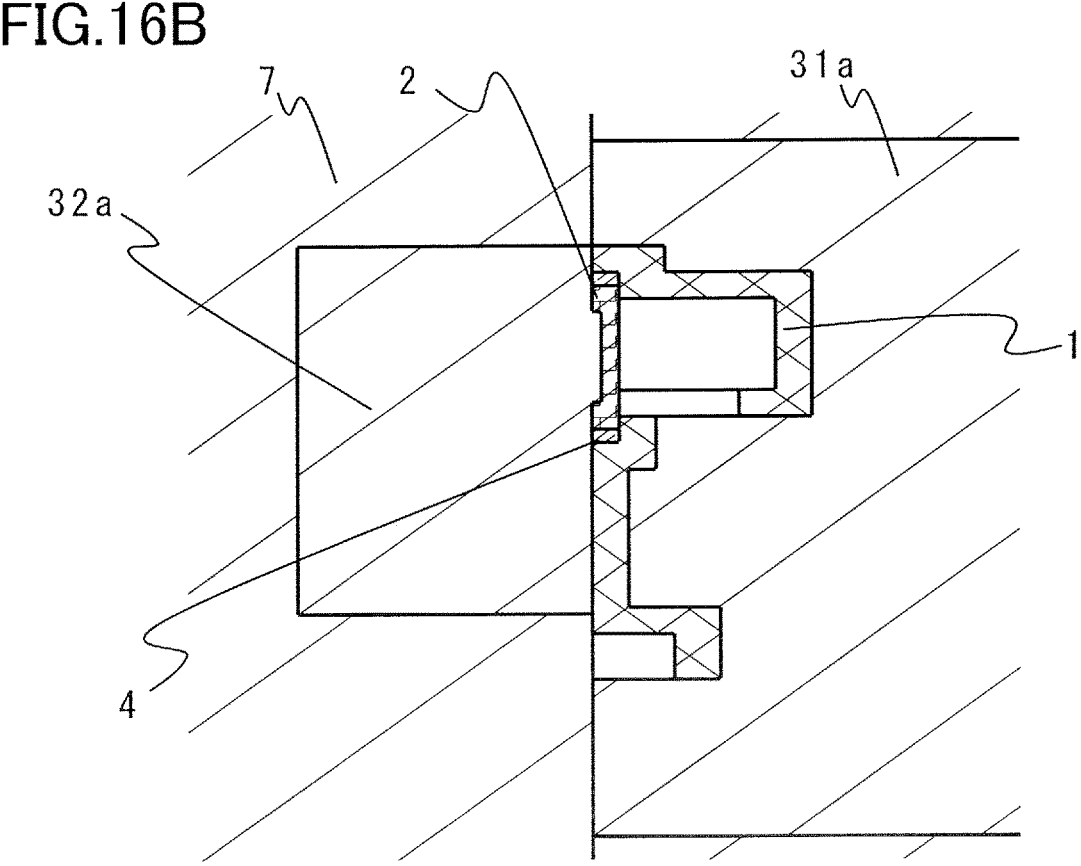

In the state of FIG. 16A, a cavity 80d for forming the joint member 4 illustrated in FIG. 1 is defined in a portion around the formed member 2 between the formed members 1 and 2. Therefore, by injecting molten resin from the injection unit 9b provided at the movable portion 7 into the cavity 80d defined by the formed members 1 and 2 and the piece portion 32a as illustrated in FIG. 16B, the joint member 4 is formed, and thus the formed members 1 and 2 are joined.

To be noted, in the present exemplary embodiment, the injection unit 9b for injection molding of the joint member 4 is disposed on the movable portion 7 as illustrated in FIG. 5. However, the injection of resin into the mold may be performed from the side of the piece portion 32a of the rotatable portion 6 instead of the side of the movable portion 7. In this case, as illustrated in FIG. 17, for example, a configuration in which an injection unit 9c is disposed on a frame portion 11a and an unillustrated flow path for resin is appropriately joined between the injection unit 9c and the piece portion 32a at the third process position 150c may be employed. However, injection molding of the joint member 4 is not always necessary. For example, depending on the specification of the part 101, a configuration in which the formed members 1 and 2 are assembled into a single assembly by connecting engagement portions or fitting portions disposed on the formed member 1 and 2 by inverting and moving the piece portion 32a as illustrated in FIGS. 15A to 15C may be employed.

As described above, in the present exemplary embodiment, a plurality of forming portions, which are the piece portions 31a and 32a in the present exemplary embodiment, respectively for the formed members 1 and 2 are disposed on each of the forming surfaces 30a to 30d of the rotatable portion 6. Further, by inverting and moving the piece portion 32a toward the piece portion 31a at the third process position 150c as illustrated in FIGS. 15A to 15C, the formed members 1 and 2 are combined and assembled, or further joined by resin. As described above, in the present exemplary embodiment, since the formed members 1 and 2 whose combination is limited is combined on the same forming surface of the rotatable portion 6, the part 101 can be produced with a high precision.

Next, the fifth step will be described with reference to FIGS. 2A, 2B, 8, 14, 15, and 18. FIG. 18 illustrates how the formed member 2 is released from the piece portion 32a of the rotatable portion 6.

Figure 18A:
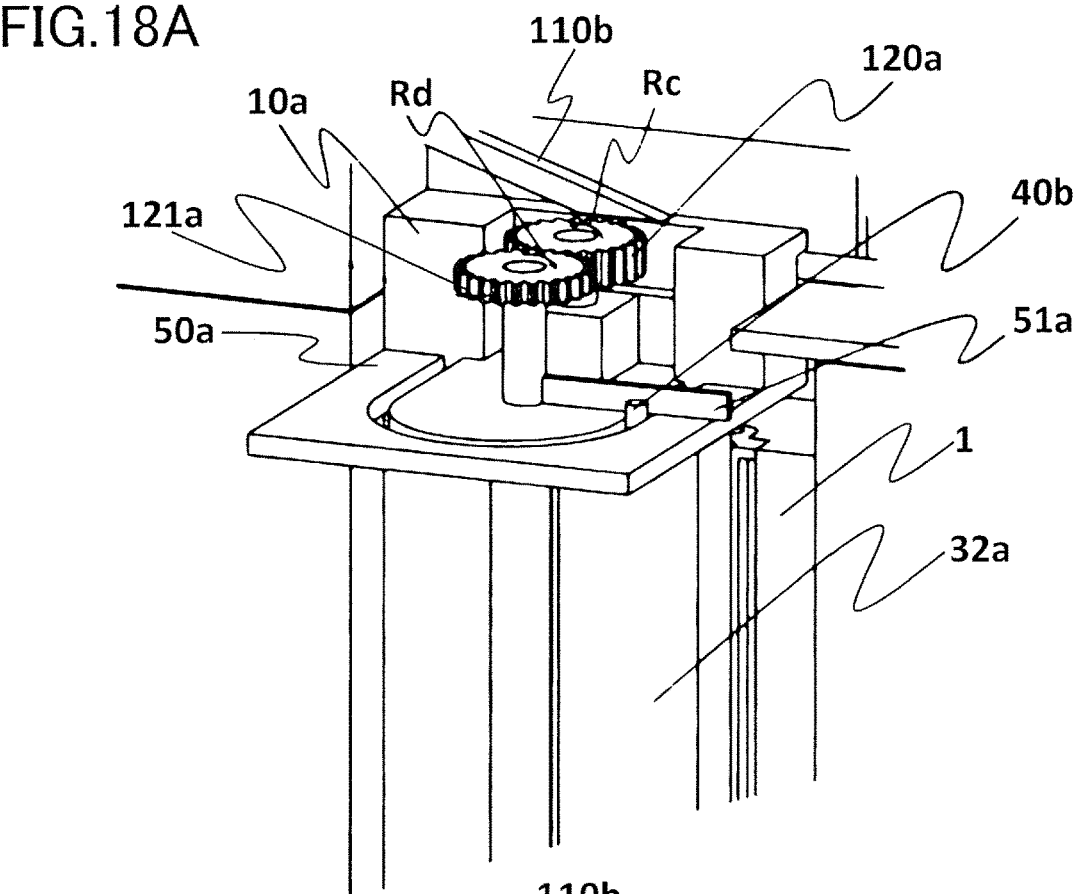
FIGS. 18A and 18B respectively illustrate a perspective view of the mold illustrating a state at the time of releasing a formed member from a mold piece.
Figure 18B:
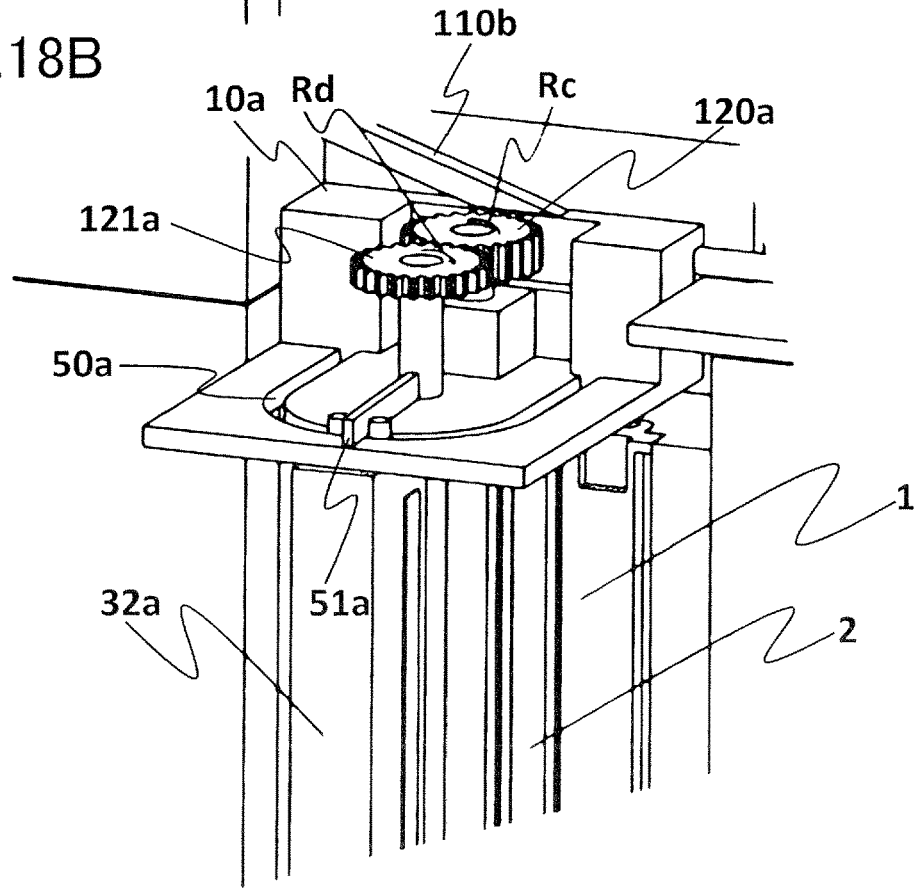

In the fifth step indicated by K3 in FIG. 2B, the mold is opened by moving the movable portion 7 in an X2 direction away from the rotatable portion 6 illustrated in FIG. 8. As illustrated in FIGS. 18A and 18B, the driving portion 10a is operated in an order reversed from the order illustrated in FIGS. 15A to 15C as illustrated in FIGS. 18A to 18B, and the state is returned to the state of FIG. 15A. The same applies to the case of the driving portion 10b. At this time, the formed member 2 is released from the piece portion 32a.

For example, as illustrated in FIGS. 18A and 18B, the gear 120a of the driving portion 10a is rotated in an Rc direction. As a result of this, the lever 51a and the gear 121a rotate in an Rd direction, the lever 51a comes into contact with the shaft 40b, and causes the piece portion 32a to invert and move in a direction opposite to FIG. 15 along the groove 50a. As a result of this, the piece portion 32a is inverted and moved in a direction away from the formed member 1. In addition, although what has been described above is an operation related to the driving portion 10a, a similar operation is performed on the driving portion 10b side.

At this time, the formed member 2 has been already joined to the formed member 1 by the joint member 4, and the joining force thereof is stronger than the holding force between the piece portion 32a and the formed member 2. Therefore, the formed member 2 is released from the piece portion 32a and remains on the formed member 1. Then, the driving portions 10a and 10b are operated in the order reversed from FIGS. 14B and 14C to respectively move upward and downward, and thus are separated from the piece portion 32a.

Figure 19:
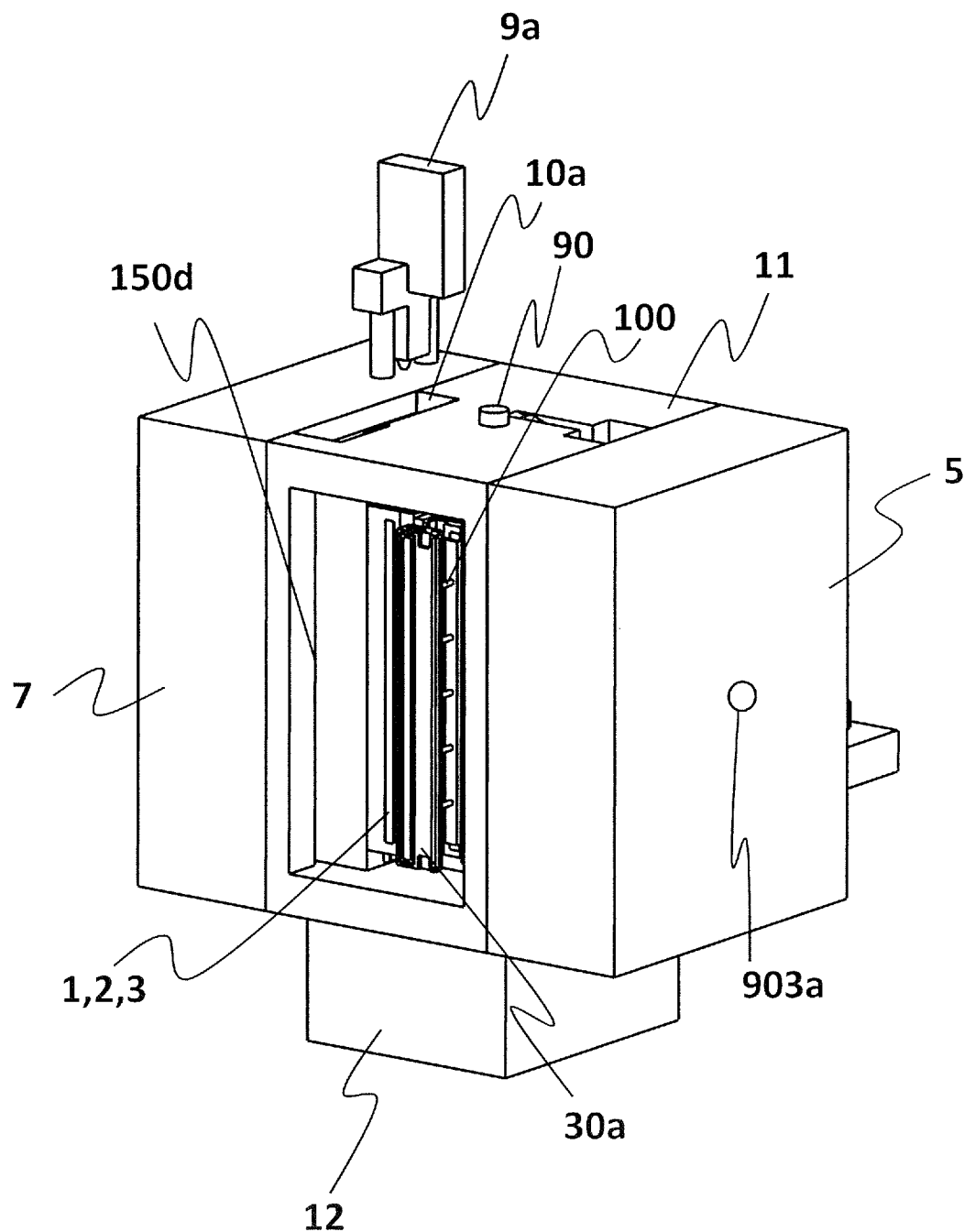
FIG. 19 is a perspective view of the mold illustrating a state in which a produced part is taken out from the rotatable portion at a take-out position.

Next, the sixth step of taking out the part 101 that has been molded and assembled will be described with reference to FIGS. 2, 10, 19, and 20. FIG. 19 illustrates how the formed members 1, 2, and 3 are released from the rotatable portion 6. In addition, FIG. 20 illustrates a section view of the mold illustrating a state in which molding, assembly, or taking out is performed on all of the forming surfaces 30a to 30d of the rotatable portion 6.

In the sixth step indicated by K4 of FIG. 2B, the rotatable portion 6 is pivoted in the R direction by 90° about the pivot shaft 90 by a driving portion 12 in a state in which the formed members 1 to 4 have been molded and assembled on a forming surface of the rotatable portion 6, for example, the forming surface 30a, as illustrated in FIG. 10. As a result of this, the forming surface 30a is moved to the take-out position 150d as illustrated in FIG. 19. At this take-out position 150d, the formed members 1 to 3 are included in the rotatable portion 6, pushed out and released by, for example, ejector pins 100 driven by a solenoid or an air cylinder, and thus taken out. The drive source of the ejector pins 100 used at this time, for example, the solenoid or air cylinder may be provided on the frame portion 11 side instead of in the rotatable portion 6. In the manner described above, the formed members 1 to 3 are molded and assembled, and thus the part 101 illustrated in FIG. 1 is completed.

In the present exemplary embodiment, as illustrated in FIG. 20, the part 101 completed by the formed members 1 to 3 is taken out at the take-out position 150d in a state in which the rotatable portion 6 and the frame portion 11 and the movable portion 7 and the fixed portion 5 are closed. According to this, at the first process position 150a, formed members 1d and 2d can be formed on the forming surface 30d. In addition, at the second process position 150b, a formed member 3c can be formed on a formed member 1c on the forming surface 30c by the slide portion 8 and the injection unit 9a. Further, at the third process position 150c, a formed member 2b can be joined with a formed member 1b on the forming surface 30b by inversion and movement of the piece portion 32a and injection molding of the joint member 4. In addition, at the take-out position 150d, the part 101 constituted by the formed members 1 to 3 that have been molded and assembled is released by ejector pins 108 corresponding to the ejector pins 100 of FIG. 19 and is thus taken out.

As described above, in the present exemplary embodiment, the steps described above can be sequentially performed in parallel on the four different forming surfaces 30a to 30d of the rotatable portion 6 having the same configuration, and thus molding and assembly can be successively performed with a high precision. As a result of this, a large number of parts 101 can be successively produced with a remarkably high efficiency.

Figure 21:
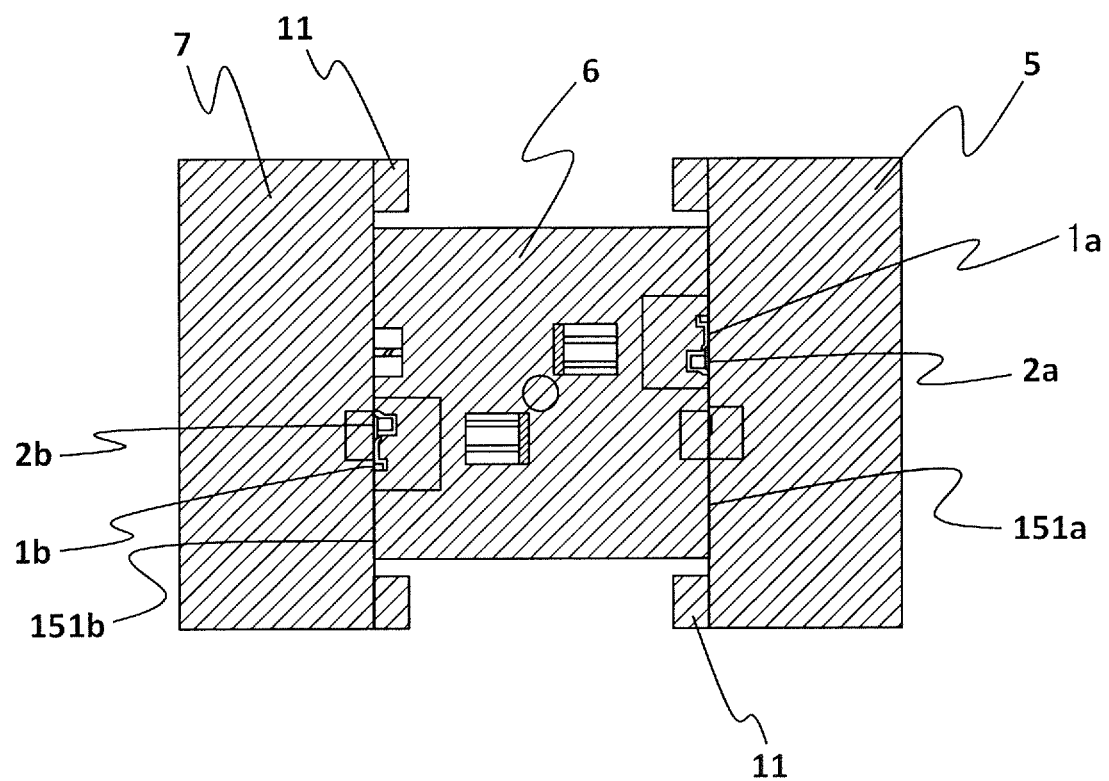
FIG. 21 is a section view of the mold illustrating an arrangement of different forming surfaces of the rotatable portion and molding and assembly performed in this arrangement.

To be noted, although a configuration in which the four different forming surfaces 30a to 30d having the same configuration are disposed on the rotatable portion 6 has been described above, the number of forming surfaces disposed on the rotatable portion 6 may be arbitrarily selected depending on the number of steps for production of the part. For example, FIG. 21 illustrates an exemplary configuration in which two different forming surfaces having the same configuration are disposed as opposing surfaces of the rotatable portion 6 and molding and assembly are performed at the first process position 151a and the second process position 151b. Alternatively, a configuration in which molding and assembly are performed by using three surfaces of the rotatable portion 6 similarly having a quadrangular prism shape may be employed. In addition, although there is a possibility that the mechanism for opening and closing the mold becomes more complex, a configuration in which the rotatable portion 6 has the same forming surface on each of n side surfaces, for example, having an n-angular prism shape, may be employed. According to such a configuration, the production process can be progressed sequentially and in parallel by using the n forming surfaces having the same shape, and thus the production efficiency of the mold can be remarkably improved.

Here, a configuration of a control system of the mold of the present exemplary embodiment and an example of a control procedure of production of the part will be described with reference to FIGS. 22 and 23.

Figure 22:
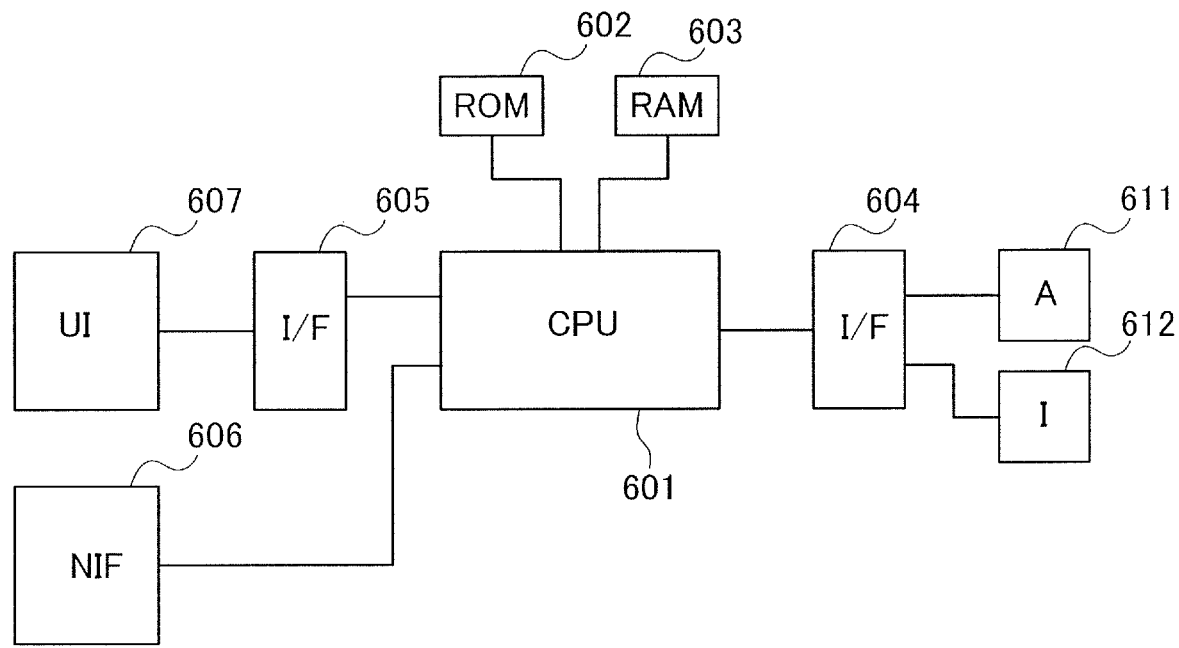
FIG. 22 is a block diagram illustrating a configuration of a control system of the mold of the first exemplary embodiment of the present invention.

A control apparatus of FIG. 22 controls the molding and assembly described above by controlling a driving apparatus 611 serving as a driving system of the mold described above and an injection molding apparatus 612 serving as an injection system that is involved in injection of molten resin and maintaining or reducing the temperature of the mold. The driving apparatus 611 serving as a driving system includes the driving portion 12 that pivots the rotatable portion 6, the electric motor that drives the gear 120a of the driving portion 10a, and the solenoid or air cylinder that drives the movement portions 110b and 110c, the ejector pins 100, and so forth. In addition, the injection molding apparatus 612 serving as a driving system includes the injection units 9a and 9b, or an injection unit of an unillustrated injection molding machine that supports the fixed portion 5 that is a fixed mold.

The control apparatus of FIG. 22 includes a central processing unit: CPU 601 serving as a main controller, a read-only memory: ROM 602 serving as a storage device, and a random access memory: RAM 603. The ROM 602 is capable of storing a control program of the CPU 601 and constant information for realizing a control procedure that will be described below. In addition, the RAM 603 is used as a work area or the like for the CPU 601 when executing the control procedure that will be described later.

To be noted, the control program of the CPU 601 for realizing the control procedure that will be described later can be also stored in storage portions such as an unillustrated external storage device such as a hard disk drive: HDD or a solid state drive: SSD and the ROM 602, for example, in an electrically erasable programmable read-only memory region: EEPROM region. In this case, the control program of the CPU 601 for realizing the control procedure that will be described later is supplied to the storage portions described above via a network interface 606 and can be updated to a new or different program. Alternatively, the control program of the CPU 601 for realizing the control procedure that will be described later can be supplied to the storage portions described above via storage media such as various magnetic disks and optical disks and flash memories and drive devices therefor, and the content thereof can be updated. The various storage media and storage portions storing the above-described control program of the CPU 601 for realizing the control procedure constitute computer readable recording media storing the control procedure of the present invention.

The CPU 601 is connected to a user interface device: UI device 607 via an interface 605. The UI device 607 can be constituted by a terminal such as a handy terminal or a control terminal constituted by a keyboard, a display, a pointing device, and so forth.

In addition, the CPU 601 is connected to the network interface 606 serving as a communication portion. Via this network interface 606, the CPU 601 can transmit and receive a control signal required for production control and a notification signal 9 that notifies the occurrence of abnormality described above. In this case, it can be considered that the network interface 606 is constituted by a communication standard of, for example, wired communication such as IEEE 802.3 or wireless communication such as IEEE 802.11 or 802.15. The network interface 606 can be used for communication with an overall control apparatus, a management server, and so forth. Examples of the overall control apparatus include a programmable logic controller: PLC that is disposed in a production line of the part including the mold of the present exemplary embodiment and performs production control. Alternatively, in the case where another production apparatus constituted by a robot arm, an X-Y stage and the like is disposed in the production line of the part including the mold, the network interface 606 can be used for communication with the production apparatus.

Figure 23:
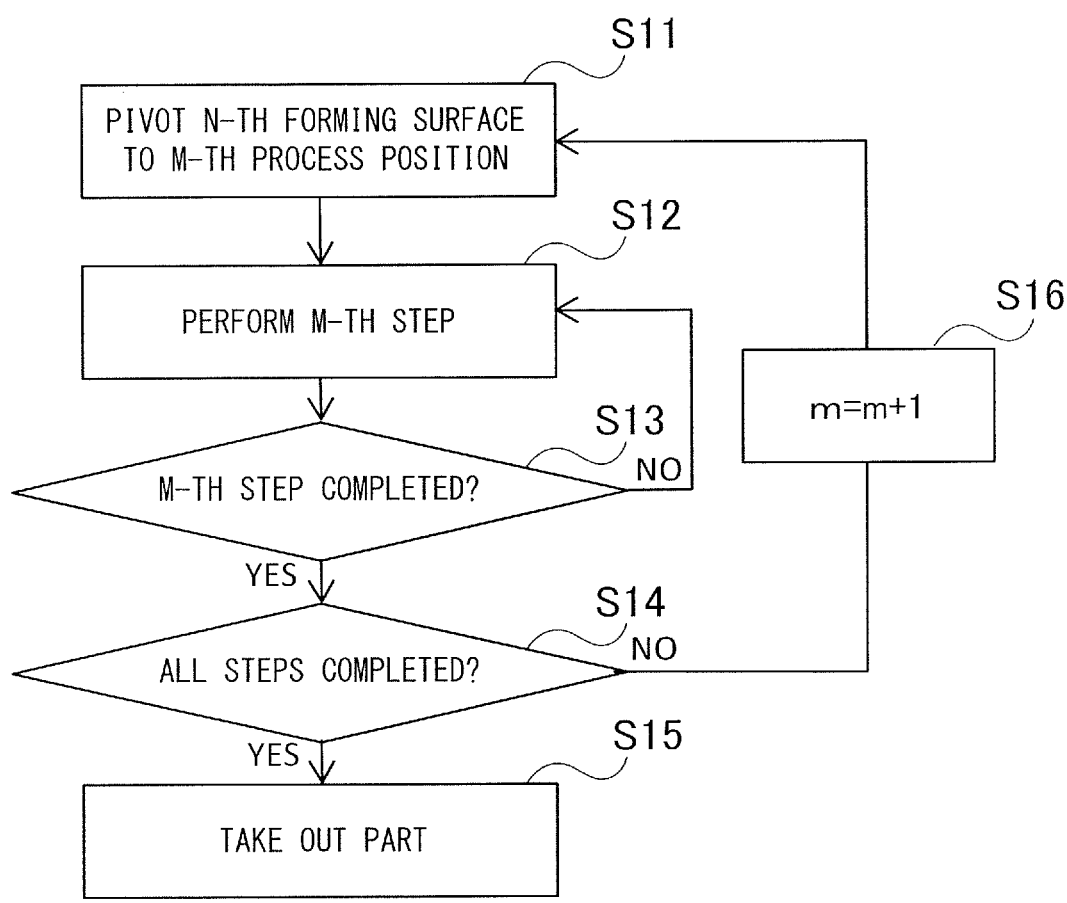
FIG. 23 is a flowchart illustrating a control procedure of the mold by the control system of FIG. 22.

FIG. 23 schematically illustrates the control procedure related to the production of the part 101 by the mold including the rotatable portion 6 described above. The illustrated procedure can be stored in the storage portion described above, for example, the ROM 602 as the control program of the CPU 601. To be noted, in the description below, for example, the forming surfaces 30a to 30d described above are respectively regarded as a first surface, a second surface, a third surface, and a fourth surface, and an expression like "n-th surface" will be used as a general expression thereof. In addition, similarly, as a general expression of the first to third process positions described above, "m-th process position" will be used. To be noted, although a production step on the n-th surface is illustrated for simplicity, production steps on the (n+1)-th surface, the (n+2)-th surface, the (n+3)-th surface, and so forth can be similarly progressed in parallel.

In step S11 of FIG. 23, the CPU 601 causes the driving portion 12 of the driving apparatus 611 serving as a driving system to pivot the rotatable portion 6 to move an n-th surface of the forming surfaces 30a to 30d to an m-th process position. In the arrangement of FIG. 20, the rotatable portion 6 is pivoted by 90°. As can be seen from the above-described configuration of the rotatable portion 6, the (n+1)-th surface, the (n+2)-th surface, the (n+3)-th surface, and so forth can be simultaneously moved to the (m+1)-th process position, the (m+2)-th process position, the (m+3)-th process position, and so forth, respectively, by this pivoting operation of the rotatable portion 6 as illustrated in, for example, FIG. 20.

In steps S12 and S13, the CPU 601 causes the m-th step to be performed on the n-th surface of the forming surfaces 30a to 30d at the m-th process position by controlling the driving apparatus 611 serving as a driving system of the mold and the injection molding apparatus 612 serving as an injection system. In this case, corresponding steps can be simultaneously performed on other forming surfaces at the (m+1)-th process position, the (m+2)-th process position, the (m+3)-th process position, and so forth.

When completion of the m-th step is confirmed in step S13, the CPU 601 determines, in step S14, whether or not all the steps on the n-th surface have been completed. In the case where it has been determined in step S14 that all the steps on the n-th surface have been completed, the part 101 has been moved to a take-out position, the take-out position 150d in the example described above, in step S15, and the part 101 is taken out in this step by using ejector pins, the ejector pins 100 or 108 in the example described above. In contrast, in the case where it has been determined that not all the steps on the n-th surface are completed yet in step S14, in step S16, the CPU 601 increments control data of a counter, or a pointer or the like, for managing the process position to indicate the next step, that is, m=m+1 is performed. Then, the control returns to step S11, and the (m+1)-th step, the (m+2)-th step, the (m+3)-th step, and so forth can be performed on the n-th surface of the forming surfaces 30a to 30d by repeating the operation described above.

By performing the control procedure schematically illustrated in FIG. 23 by using such a control system as illustrated in FIG. 22, a production process can be performed sequentially and in parallel on n forming surfaces of the same shape with a delay or advance of one step. Therefore, according to the configuration of the control system of FIGS. 22 and 23, the production efficiency of the mold can be remarkably improved.

Second Exemplary Embodiment

Figure 24:
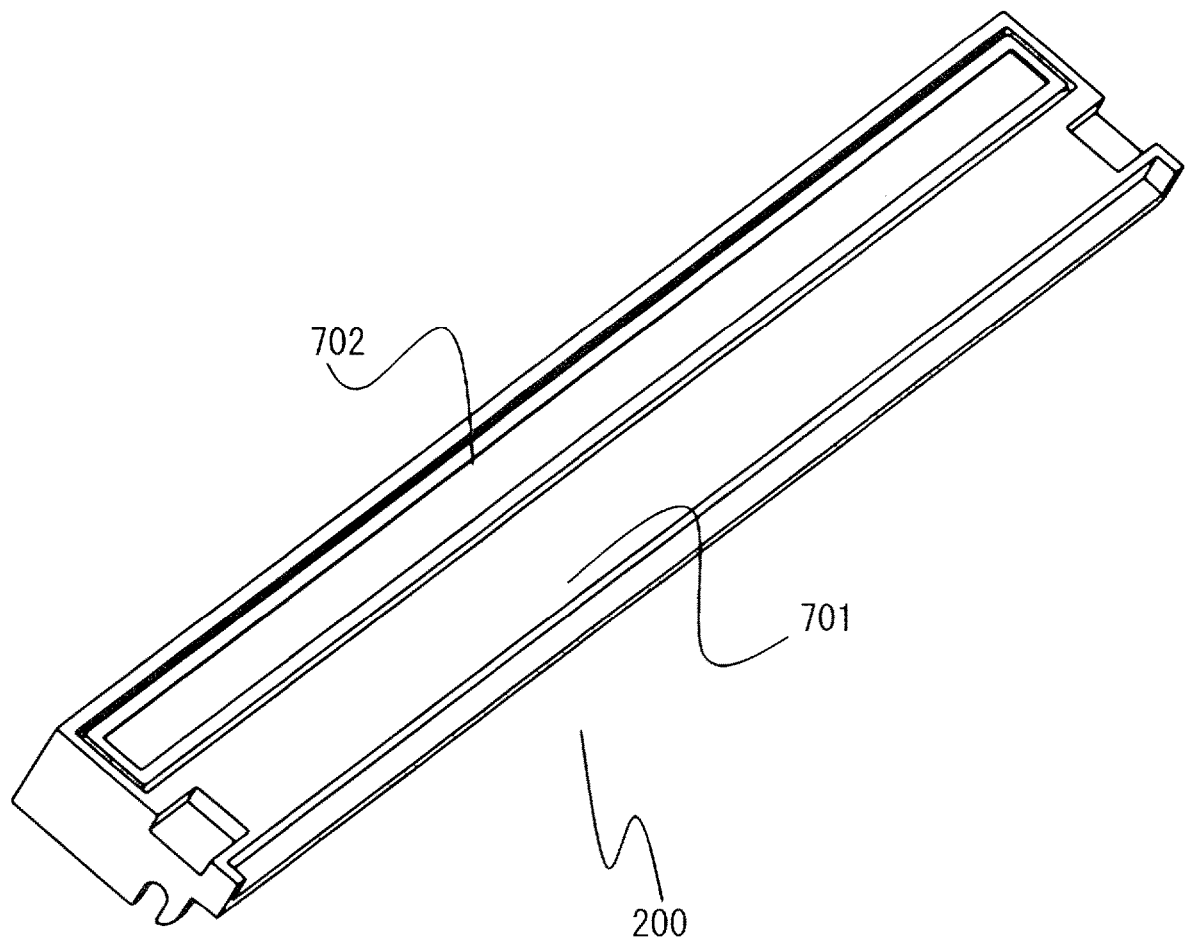
FIG. 24 is a perspective view of an example of a part produced in a second exemplary embodiment of the present invention.

A second exemplary embodiment of the present invention will be described. FIG. 24 illustrates a part 200 that is produced in the present exemplary embodiment.

The part 200 is, for example, a cleaning unit used for a cartridge of an image forming apparatus, and is assembled from molded resin members that are each a single separate member. As illustrated in FIG. 24, the part 200 is constituted by resin members 701 and 702. The resin members 701 and 702 are integrated and unitized to be a cleaning unit by performing injection molding of molten resin serving as a material for each member and assembly by using a mold that will be described later.

In particular, the resin members 701 and 702 are each formed by injection molding using a forming portion formed in the mold. Then, a piece portion holding one of the resin members 701 and 702 that have been formed is inverted and moved to mount the one of the resin members 701 and 702 on the other of the resin members 701 and 702. In the following example, the resin member 702 is mounted on the resin member 701. At this time, the resin members 701 and 702 are joined via a fitting or engaging structure including, for example, a projection and a groove.

Figure 25A:
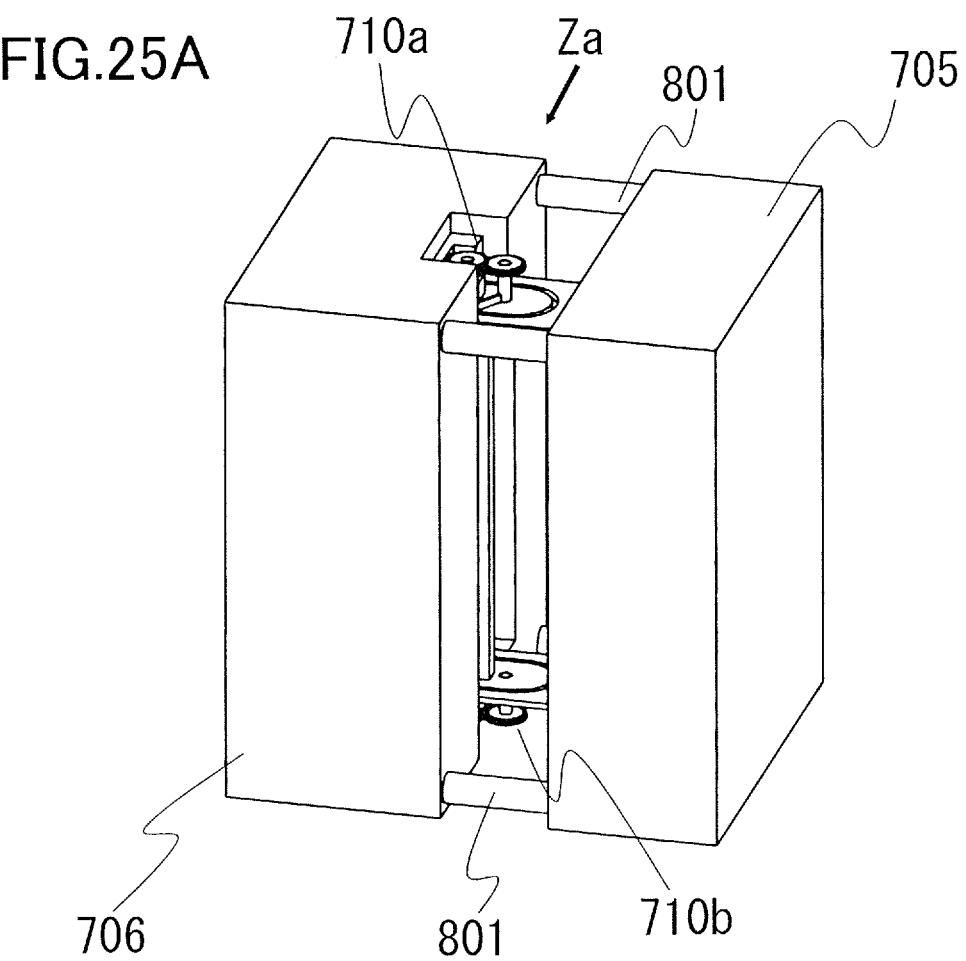
FIGS. 25A and 25B illustrate a configuration of a molding assembly apparatus according to the second exemplary embodiment, FIG. 25A being a perspective view of the molding assembly apparatus, FIG. 25B being a top view of the molding assembly apparatus illustrating a production process performed by the molding assembly apparatus.
Figure 25B:
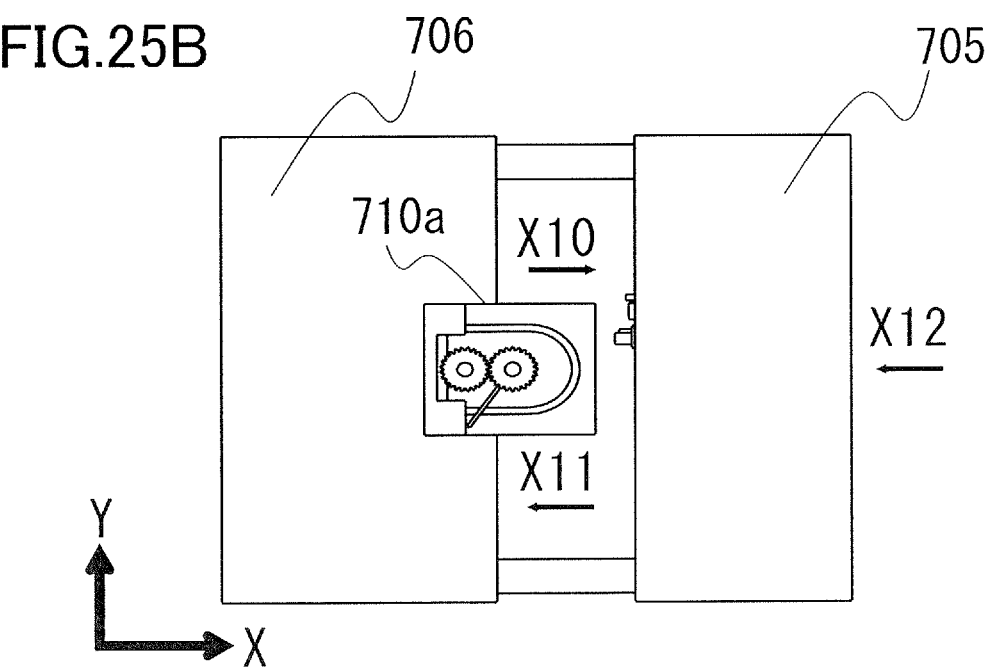
Figure 26:
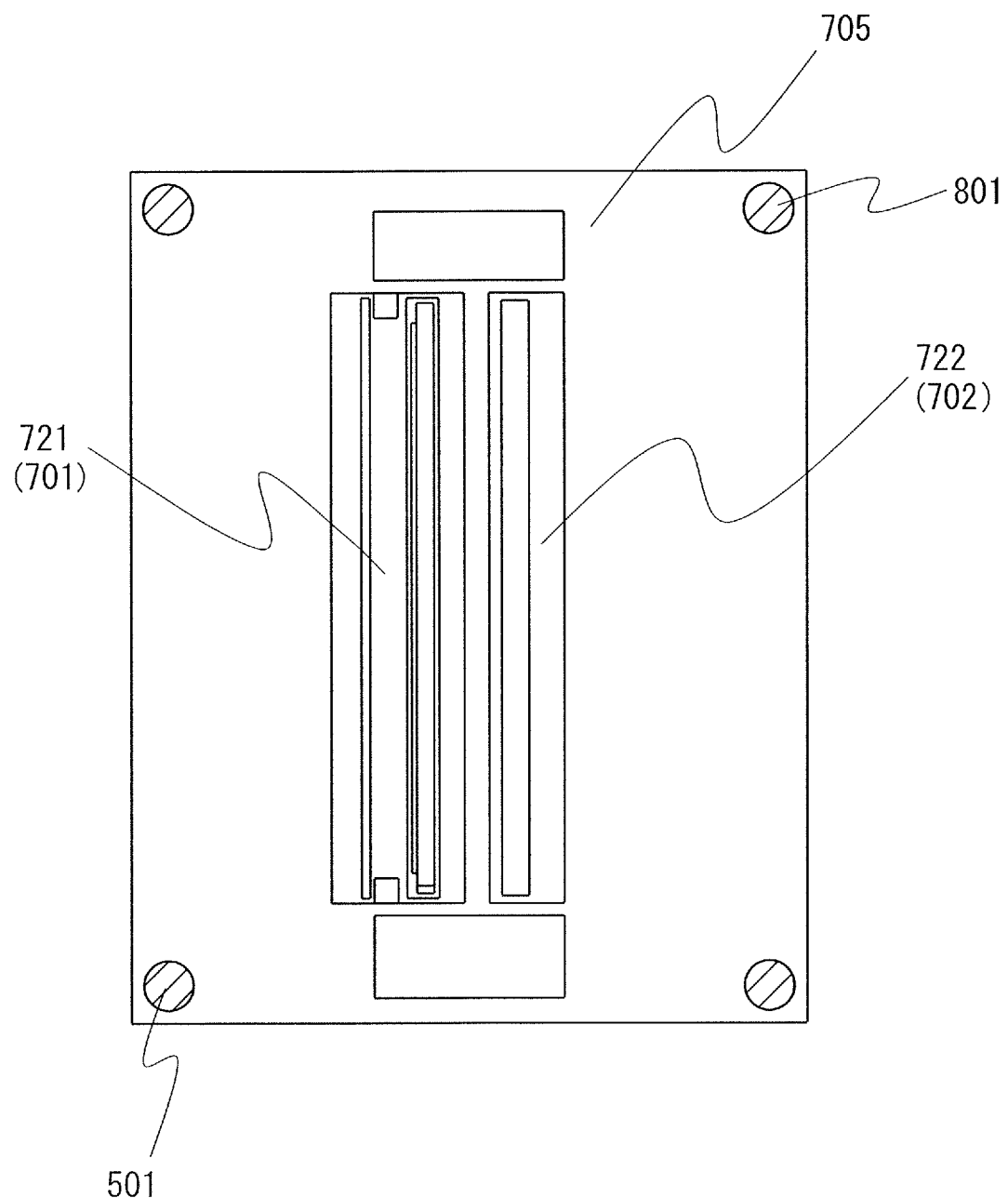
FIG. 26 is a front view of a mold according to the second exemplary embodiment illustrating a configuration thereof.
Figure 27:
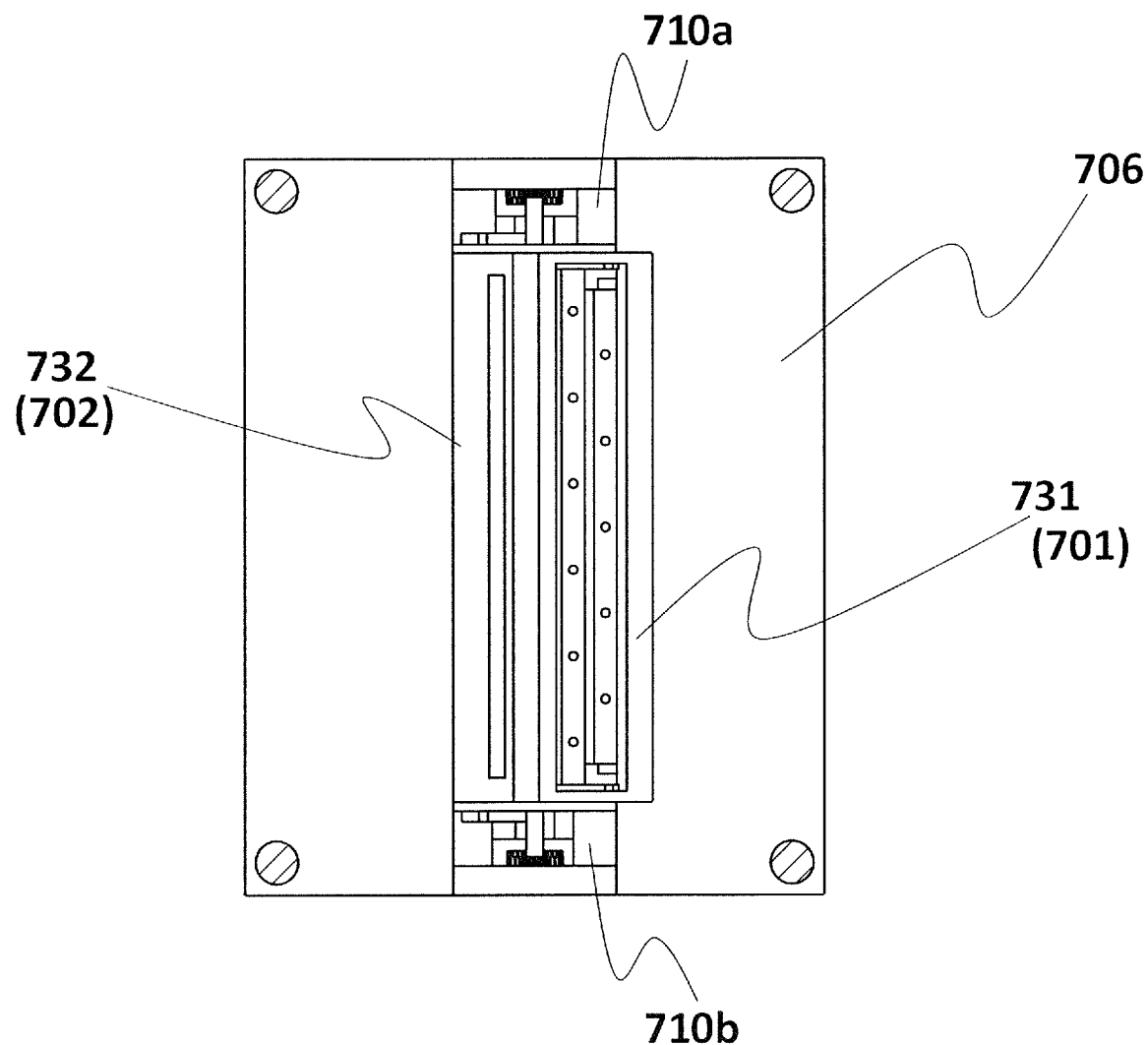
FIG. 27 is a front view of a forming surface of the mold according to the second exemplary embodiment.

Next, a mold for assembling the part 200 and a mold configuration thereof will be described with reference to FIGS. 25A to 27. FIGS. 25A to 27 illustrate a configuration of the mold of the present exemplary embodiment. FIG. 25A is a perspective view of the mold, and FIG. 25B is a top view of the mold. FIG. 25A illustrates an overall configuration of the mold including a fixed portion 705 and a movable portion 706. The fixed portion 705 will be sometimes also referred to as a first portion 705, and the movable portion 706 will be also sometimes referred to as a second portion 706. FIG. 26 illustrates the first portion 705 as viewed from the right in FIG. 25A, and FIG. 27 illustrates the second portion 706 as viewed from the left in FIG. 25A.

As illustrated in FIG. 25, the mold of the present exemplary embodiment is constituted by the fixed portion 705 and the movable portion 706. As illustrated in FIG. 26, the fixed portion 705 includes forming portions 721 and 722 for forming the resin members 701 and 702. The forming portions 721 and 722 are both provided on the same forming surface of the fixed portion 705.

In addition, as illustrated in FIG. 27, the movable portion 706 includes forming portions 731 and 732 formed to oppose the forming portions 721 and 722 of the fixed portion 705. These forming portions 731 and 732 are both provided on the same forming surface of the movable portion 706.

The forming portion 732 of the movable portion 706 that is a forming portion for the resin member 702 is constituted by a piece portion 732a that is attachable to and detachable from the movable portion 706. The piece portion 732a is illustrated in, for example, FIG. 28. Driving portions 710a and 710b are respectively provided on end portions of the movable portion 706 along a Za direction of the forming portion 732. The driving portions 710a and 710b correspond to an inversion movement apparatus that inverts and moves the piece portion 732a, in a state in which the resin member 702 that has been formed is held by the piece portion 732a, to mount the resin member 702 on the resin member 701 held by the forming portion 731. The detailed configuration of the driving portions 710a and 710b will be described below.

In the mold of the present exemplary embodiment, the fixed portion 705 can be fixed to a fixed board of the injection molding machine, and the mold can be opened and clamped by moving the movable portion 706 with respect to the fixed portion 705. It is assumed that an unillustrated injection mechanism of molten resin of the injection molding machine is connected to the fixed portion 705. Although an example in which the attachable and detachable piece portion 732a is formed on the movable portion 706 as illustrated in, for example, FIG. 28, has been shown in the present exemplary embodiment for the sake of convenience, the piece portion 732a may be formed on the fixed portion 705. That is, although one has been named the fixed portion 705 and the other has been named the movable portion 706 for the sake of convenience, a configuration in which the movable portion 706 is attached to the fixed board of the injection molding machine and the fixed portion 705 is movable may be also employed.

As illustrated in FIG. 25A, the mold of the present exemplary embodiment includes a plurality of guides 801 extending in the horizontal direction in FIG. 25A. In this example, four guides 801 are provided. For example, the guides 801 are fixed with respect to the fixed portion 705 and penetrate the movable portion 706 to guide the movable portion 706. For example, by controlling the position of the movable portion 706 on the guides 801 by an unillustrated driving system of the injection molding machine, the movable portion 706 can be moved with respect to the fixed portion 705 to clamp or open the mold.

Next, a molding and assembly operation and a production method of the part 200 in the configuration described above will be described. In the present exemplary embodiment, the resin members 701 and 702 illustrated in FIG. 24 are molded and integrated as a unit to form the part 200 through first to fourth steps. These steps will be described below.

Figure 28:
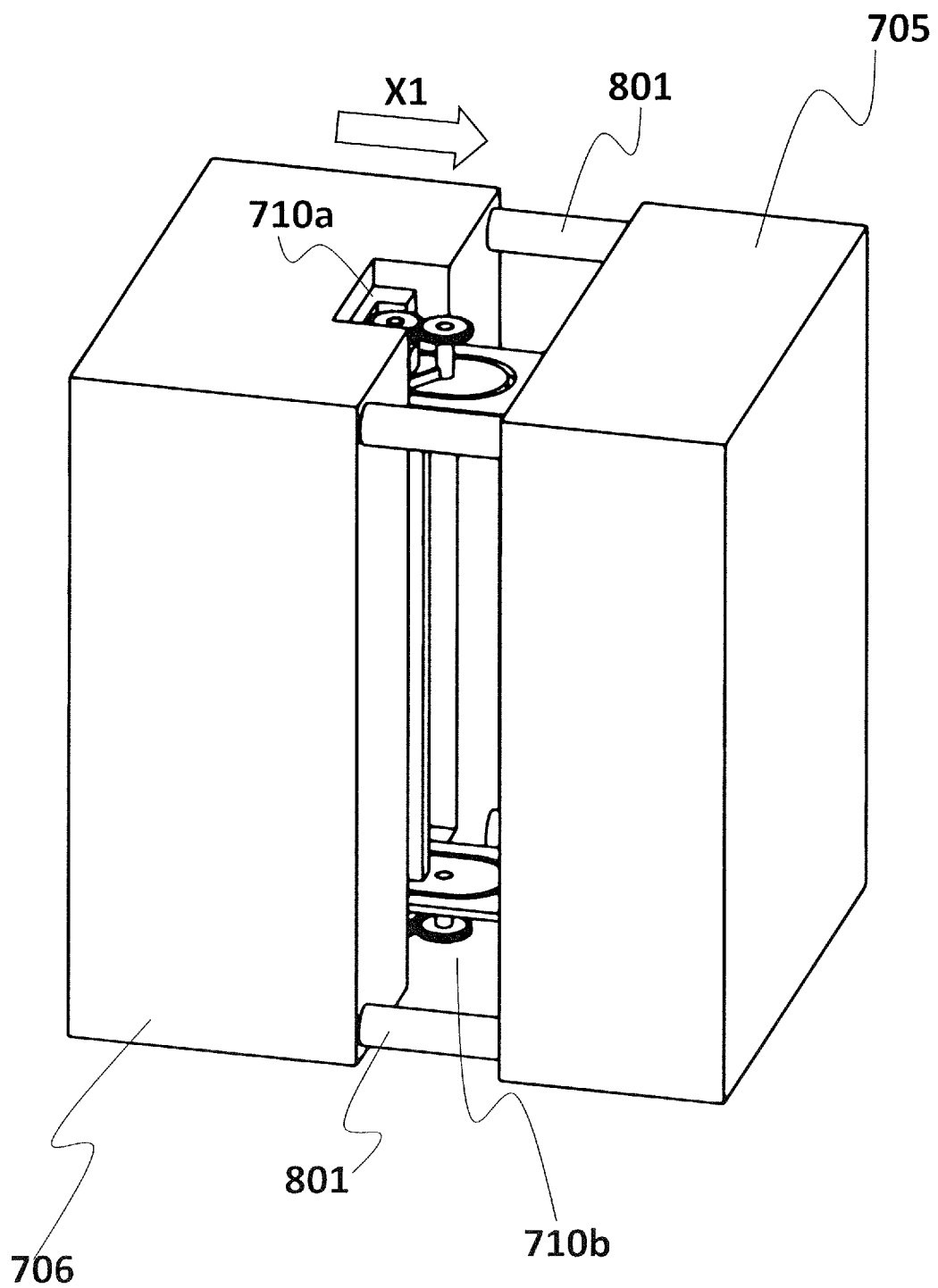
FIG. 28 is a perspective view of the mold illustrating how the mold according to the second exemplary embodiment is closed.
Figure 29A:
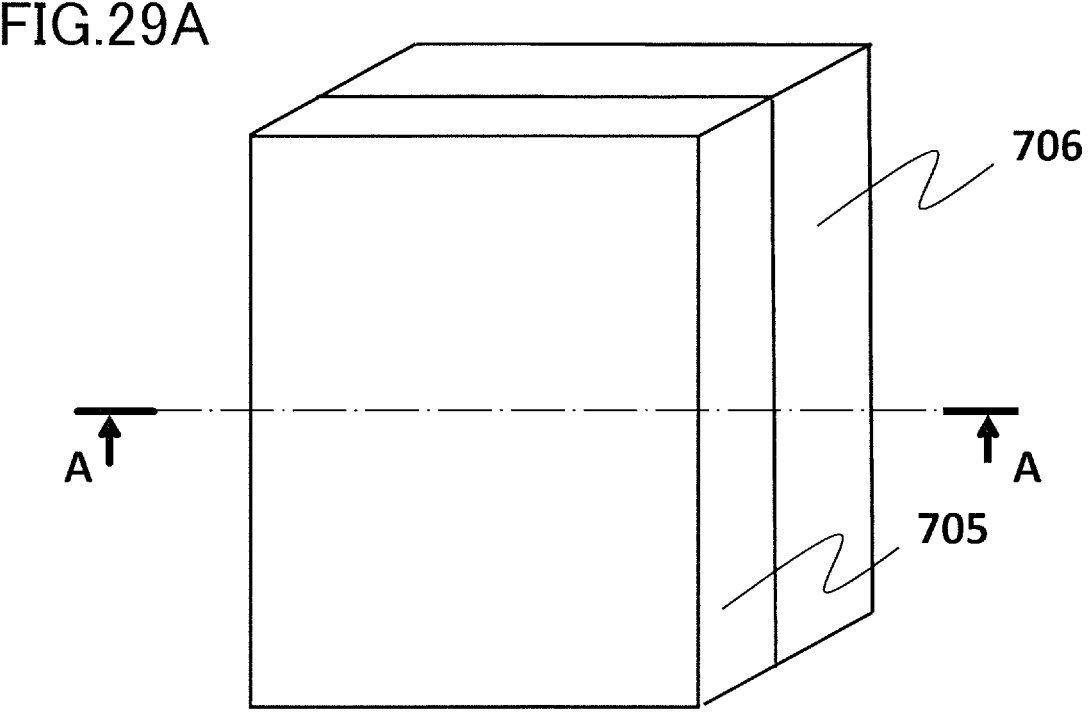
FIGS. 29A and 29B illustrate a state in which the mold is closed at a first process position according to the second exemplary embodiment, FIG. 29A being a perspective view of the mold.
Figure 29B:
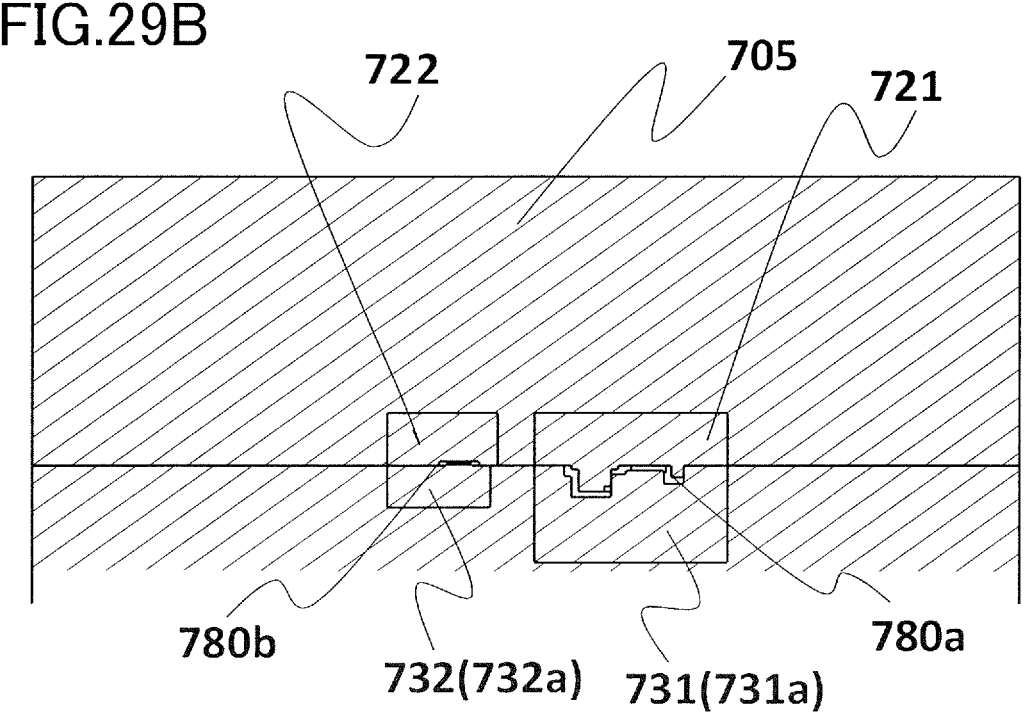
Figure 30:
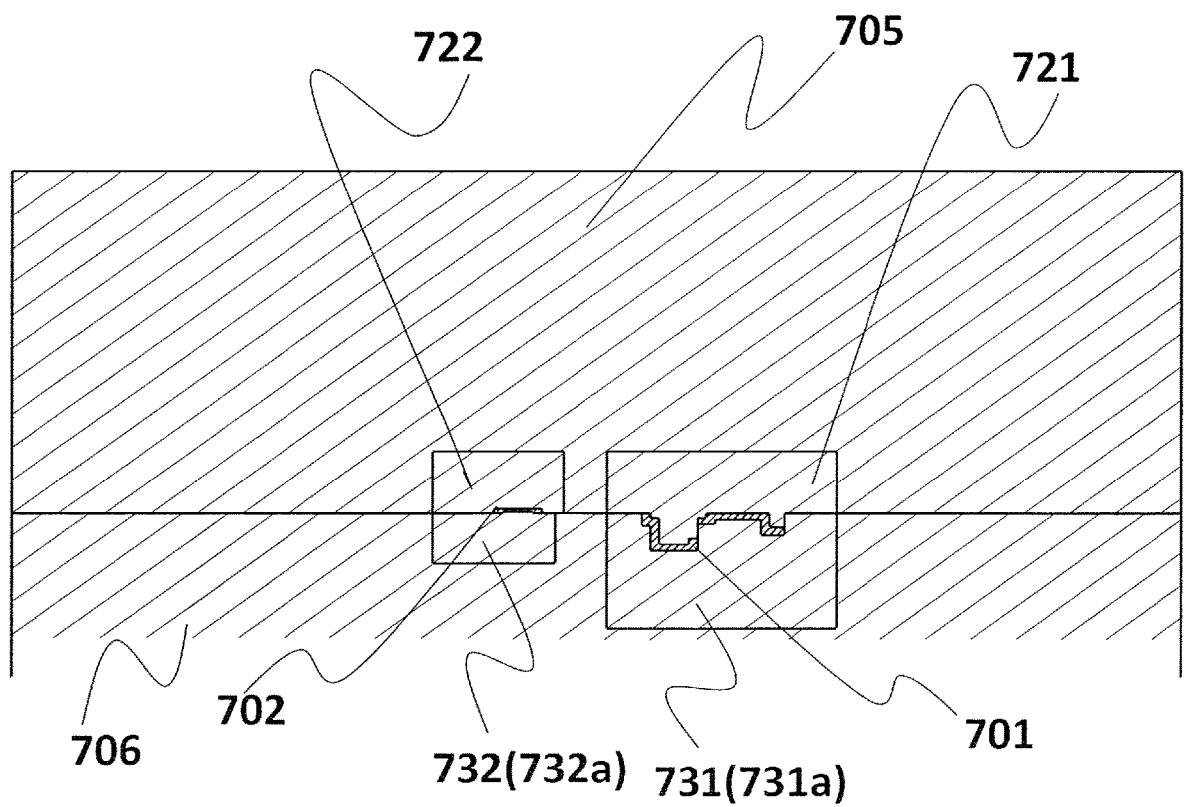
FIG. 30 is a section view of the mold illustrating a state in which a resin member is formed in the state of FIGS. 29A and 29B.

First, the first step will be described with reference to FIGS. 28 to 30. FIG. 28 illustrates how the fixed portion 705 and the movable portion 706 are closed. FIG. 29A illustrates a state in which the fixed portion 705 and the movable portion 706 are closed, and FIG. 29B is a horizontal section view of the mold taken along an A-A line of FIG. 29A. In addition, FIG. 30 illustrates a state in which injection molding of the resin members 701 and 702 are performed, in a similar manner to FIG. 29B.

In the first step serving as a molding step, as illustrated in FIG. 28, the movable portion 706 is moved in an X1 direction of the fixed portion 705, that is, in a direction in which the movable portion 706 and the fixed portion 705 become closer to each other, and thus the mold is closed in a state in which a first surface of the fixed portion 705 facing the movable portion 706 and a second surface of the movable portion 706 facing the fixed portion 705 are brought into contact with each other. For the movement of the movable portion 706, a driving portion disposed in the unillustrated injection molding machine is used. To be noted, regarding the relative movement between the fixed portion 705 and the movable portion 706, in the case where the movable portion 706 is attached to the fixed board of the unillustrated injection molding machine, the fixed portion 705 may be moved. In this case, the unillustrated injection mechanism of molten resin of the injection molding machine is connected to the movable portion 706.

FIGS. 29A and 29B illustrate a state after the fixed portion 705 and the movable portion 706 are closed. Particularly, FIG. 29B illustrates a horizontal section of the fixed portion 705 and the movable portion 706 taken along the A-A line of FIG. 29A in this closed state. As illustrated in FIG. 29B, in this closed state, the forming portions 721 and 722 of the fixed portion 705 oppose the forming portions 731 and 732 of the movable portion 706, and cavities 780a and 780b for respectively forming the resin members 701 and 702 are defined therebetween.

As described above, the forming portions 731 and 732 of the movable portion 706 are specifically constituted by the piece portions 731a and 732. In the description below, the forming portion 731 and the piece portion 731a will be sometimes referred to as a first forming portion, and the forming portion 732 and the piece portion 732a will be sometimes referred to as a second forming portion.

In the present exemplary embodiment, among these forming portions, at least the second forming portion 732, particularly the piece portion 732a is configured to be detachable from the movable portion 706. This second forming portion 732, particularly the piece portion 732a, can be detached from the second surface of the movable portion 706, which is a surface opposing the fixed portion 705, and inverted and moved with respect to the second surface by the driving portions 710a and 710b. According to this, as will be described later, the second forming portion 732, particularly the piece portion 732a, is inverted and moved to oppose the first forming portion 731, particularly 731a, and thus the resin members 701 and 702 formed in the respective forming portions are assembled.

Subsequently, as illustrated in FIG. 30, molten resin is injected into the plurality of cavities 780a and 780b respectively defined by the forming portions 721 and 722 of the fixed portion 705 and the forming portions 731 and 732 of the movable portion 706, and thus the plurality of resin members 701 and 702 are molded. For this injection of molten resin, for example, an unillustrated injection mechanism of the injection molding machine connected to the fixed portion 705 is used.

Figure 31:
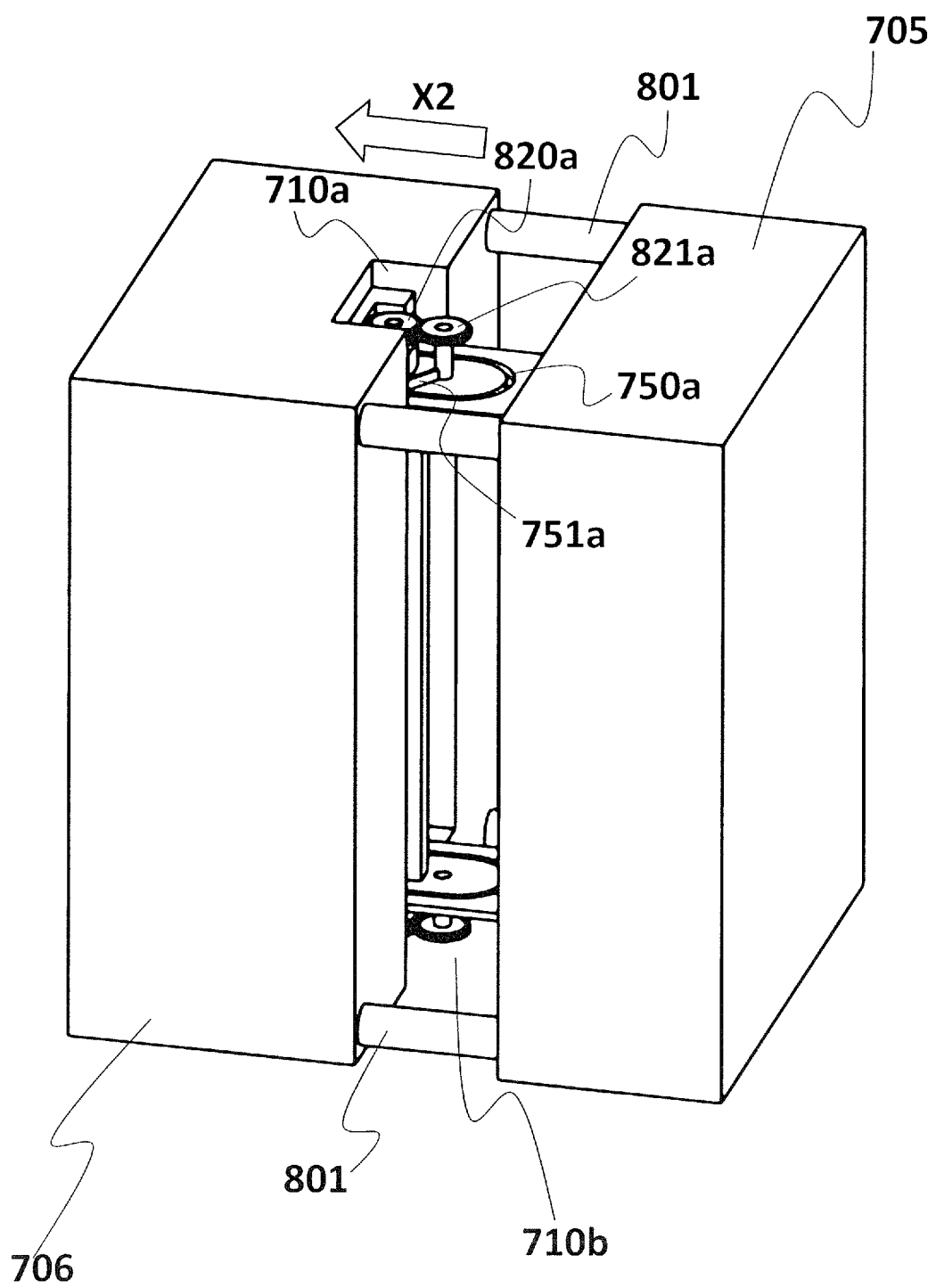
FIG. 31 is a perspective view of the mold according to the second exemplary embodiment illustrating a state in which the mold is opened.

Next, the second step will be described with reference to FIGS. 31 and 32. This second step corresponds to a preparation step for the third step serving as an assembly step that will be described above, and is mainly a step of opening the fixed portion 705 and the movable portion 706. FIG. 31 illustrates a state in which the fixed portion 705 and the movable portion 706 are open, and FIG. 32 illustrates a state in which the resin members 701 and 702 that have been formed by injection molding are held by the forming portions 731 and 732.

In this second step, as illustrated in FIG. 31, the mold is opened by relatively moving the movable portion 706 in an X2 direction away from the fixed portion 705. At this time, as illustrated in FIG. 32, the resin members 701 and 702 are respectively released from the forming portions 721 and 722 of the fixed portion 705 and respectively held by the forming portions 731 and 732 of the movable portion 706. To open the mold in this manner, the holding force of each forming portion is determined in advance by, for example, selecting the shapes of forming portions respectively disposed on the movable portion 706 and the fixed portion 705. Alternatively, a structure in which a pin or the like for release is disposed on the fixed portion 705 as necessary may be employed.

Next, the third step serving as an assembly step will be described with reference to FIGS. 32 and 33A to 33C. FIGS. 33A to 33C each correspond to a top view of the mold viewed in a Z1 direction of FIG. 32. In this third step serving as an assembly step, the resin member 702 held by the forming portion 732 of the mold is inverted and moved on the second surface by using the driving portions 710a and 710b, and thus is mounted on the resin members 701 held by the forming portion 731.

Figure 32:
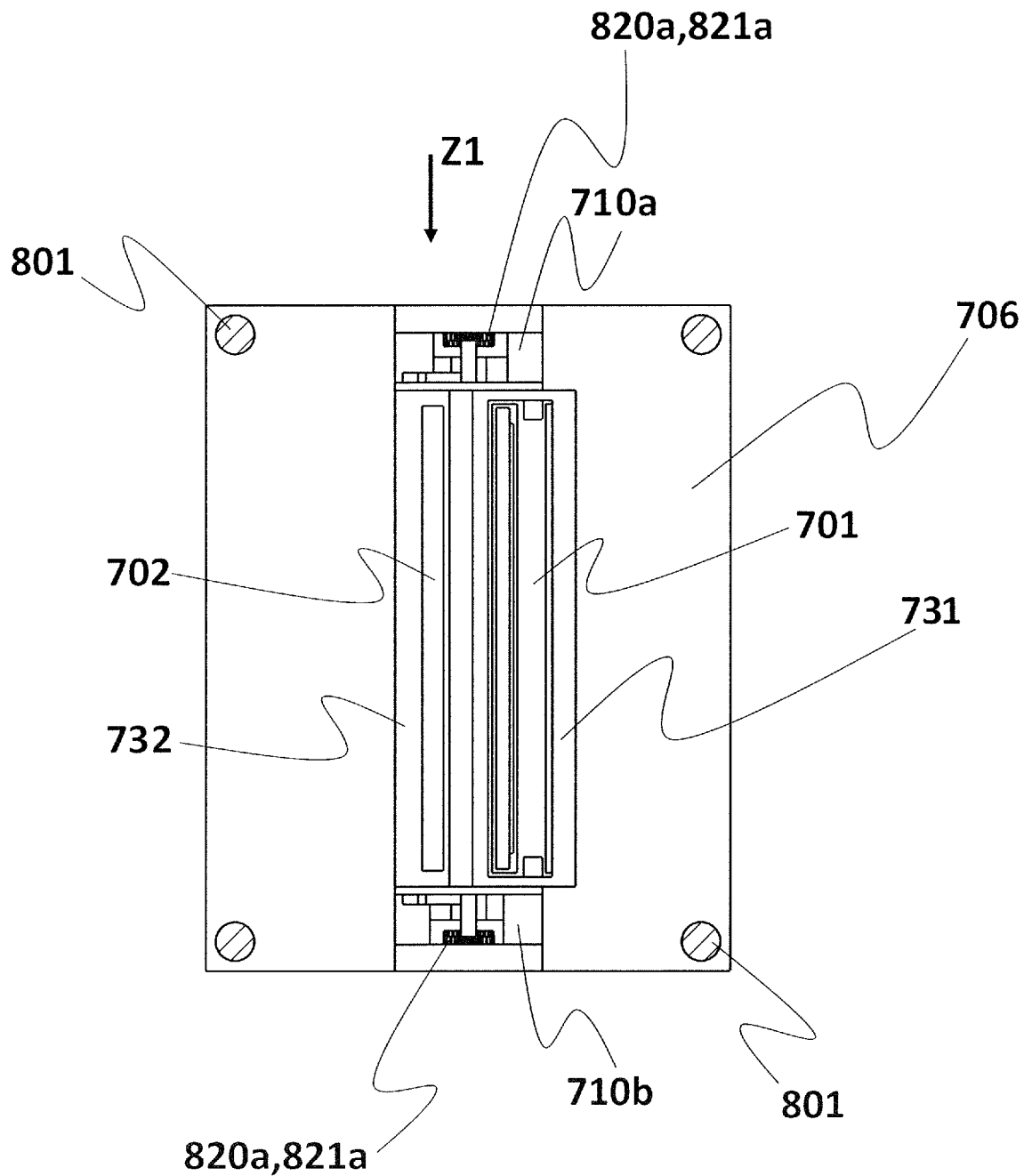
FIG. 32 is a front view of the mold according to the second exemplary embodiment illustrating a state in which the resin member is held by a forming portion of the mold.
Figure 33A:
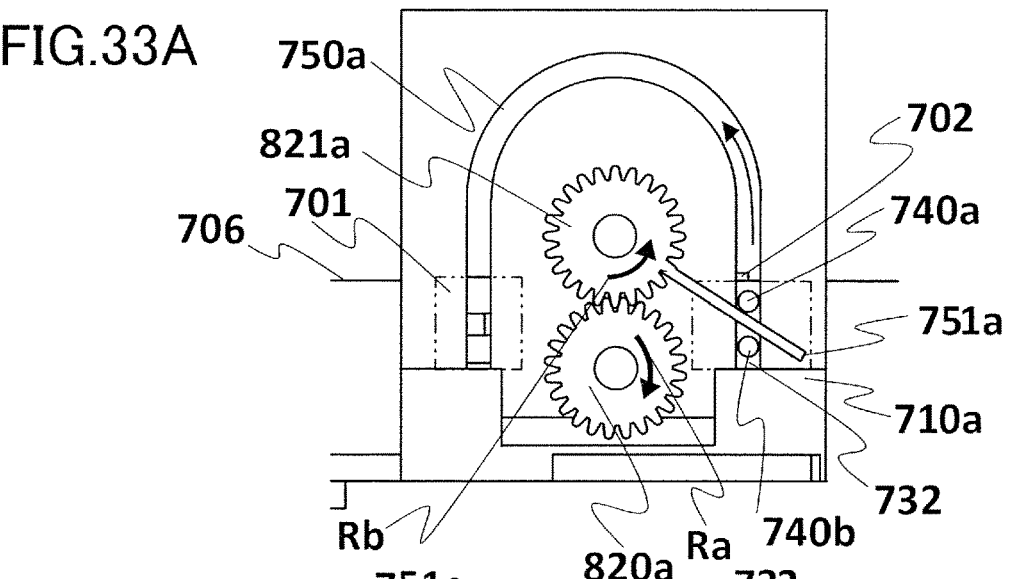
FIGS. 33A to 33C are explanatory diagrams illustrating inversion and movement of a mold piece according to the second exemplary embodiment.
Figure 33B:
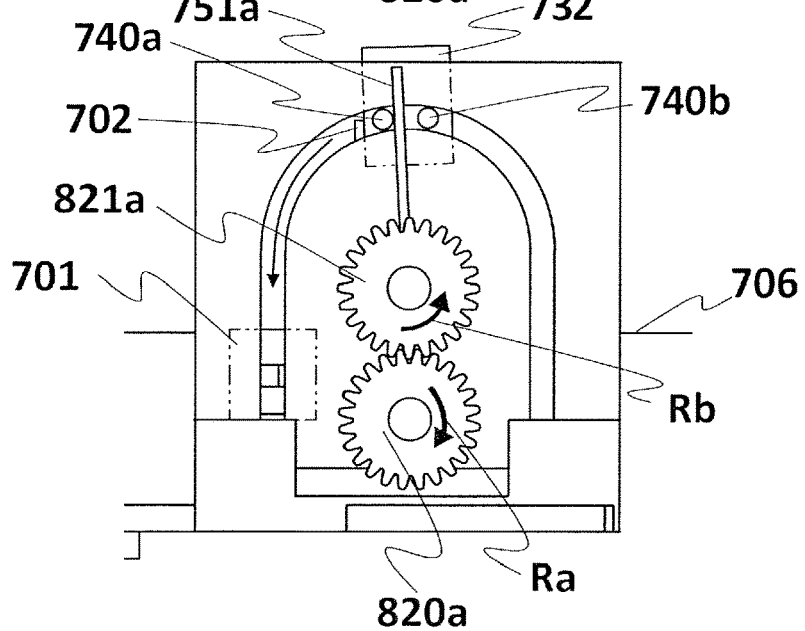
Figure 33C:
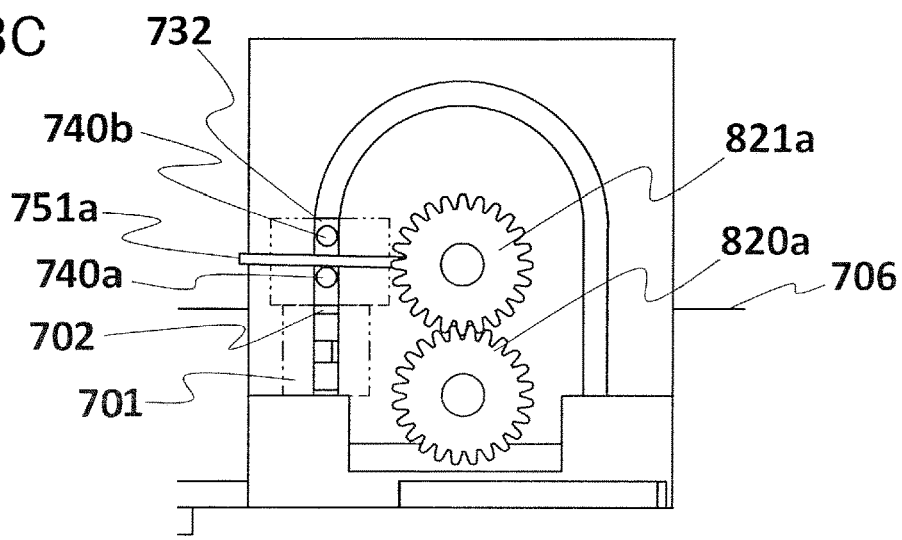

FIGS. 33A to 33C illustrate a configuration and operation of the driving portion 710a at the upper part in FIG. 32 for inverting and moving the second forming portion 732, particularly the piece portion 732a to oppose the first forming portion 731, particularly the piece portion 731a. To be noted, the structure of the driving portion 710b of FIG. 32 is the same as the structure of the driving portion 710a except that the arrangement of components is vertically inverted. In FIG. 33A, the driving portion 710a includes a U-shaped groove 750a provided as a guide portion. Shafts 740a and 740b are provided to project from the top end surface of the forming portion 732, that is, the piece portion 732a, and are engaged with the groove 750a.

Figure 34A:
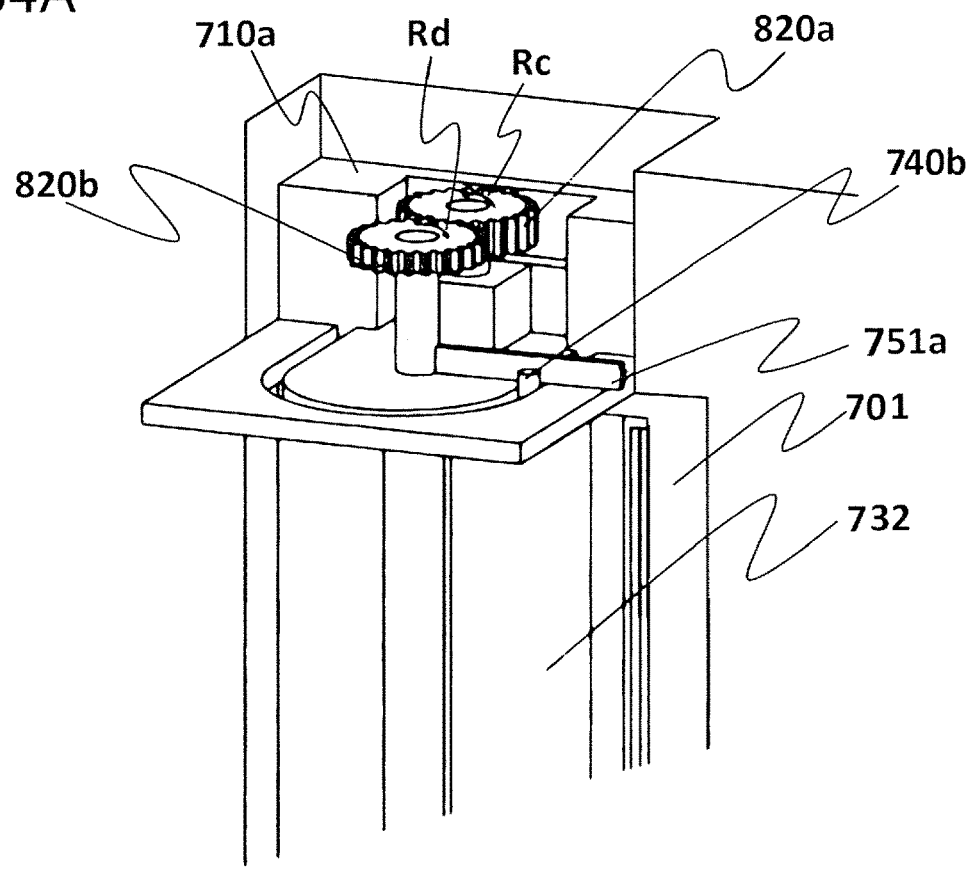
FIGS. 34A and 34B respectively illustrate a perspective view of the mold piece according to the second exemplary embodiment illustrating an operation of releasing the resin member from the mold piece.
Figure 34B:
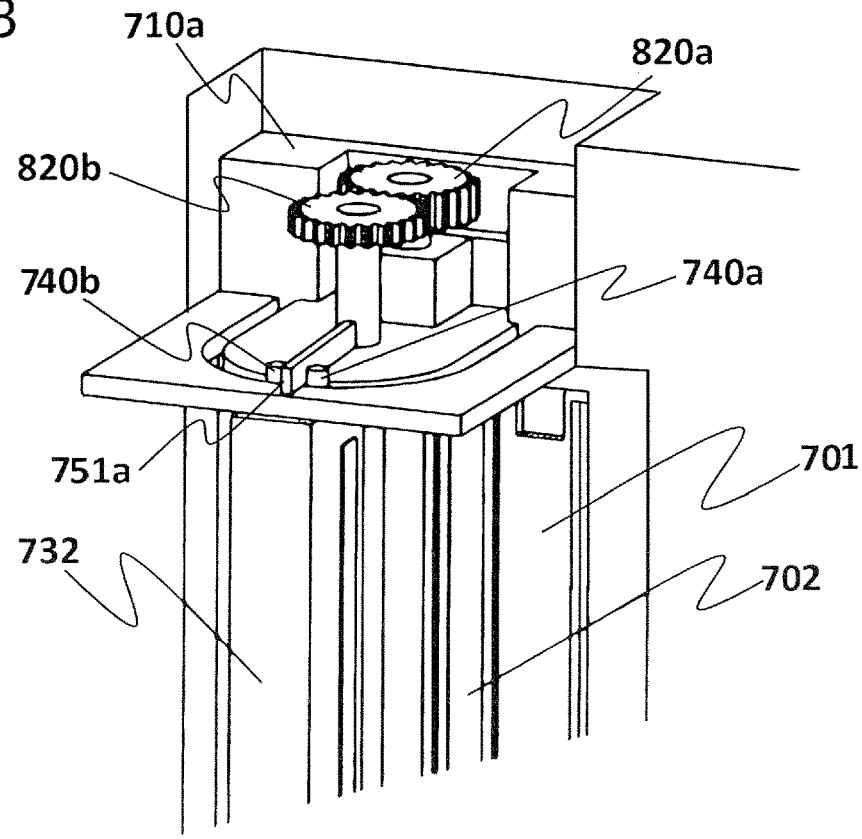

Meanwhile, a lever 751a is fixed to a pivot shaft of a gear 821a as illustrated in FIGS. 34A and 34B, and this lever 751a is engaged with a space between the shafts 740a and 740b. The gear 821a engages with a gear 820a, and the gear 820a is rotated by a drive source such as an electric motor, although details thereof are not illustrated. The rotation directions of the gears 820a and 821a in this third step serving as an assembly step are respectively Ra and Rb directions illustrated in FIGS. 33A and 33B. According to this structure, in the case where the lever 751a of the driving portion 710a is swung, the shafts 740a and 740b provided to project from the forming portion 732, that is, the piece portion 732a, move along the groove 750a as illustrated in FIGS. 33A to 33C.

According to this, as indicated by two-dot chain lines in FIGS. 33A to 33C, the forming portion 732, that is, the piece portion 732a holding the resin member 702 is detached from the second surface of the movable portion 706 opposing the fixed portion 705, inverted and moved with respect to the second surface, and controlled at a position and orientation opposing the forming portion 731, that is, the piece portion 731a.

As described above, the resin member 702 held by the forming portion 732, that is, the piece portion 732a, can be opposed to the resin member 701 held by the forming portion 731, that is, the piece portion 731a, by inverting and moving the forming portion 732, that is, the piece portion 732a, with respect to the second surface by using the driving portion 710a. Then, for example, by further pressing the forming portion 732, that is, the piece portion 732a, by the driving portion 710a, the resin member 702 can be mounted on the resin member 701. To be noted, it is assumed that fitting structures such as a projection and a groove that can be joined by the driving force of the driving portion 710a are formed on the resin members 701 and 702 by injection molding. Examples of the fitting structure include a clickstop. Although an operation of the driving portion 710a provided at an upper portion of the forming portion 732, that is, the piece portion 732a, has been described, it goes without saying that the driving portion 710b at a lower portion of the forming portion 732, that is, the piece portion 732a, operates in a similar manner.

Figure 35:
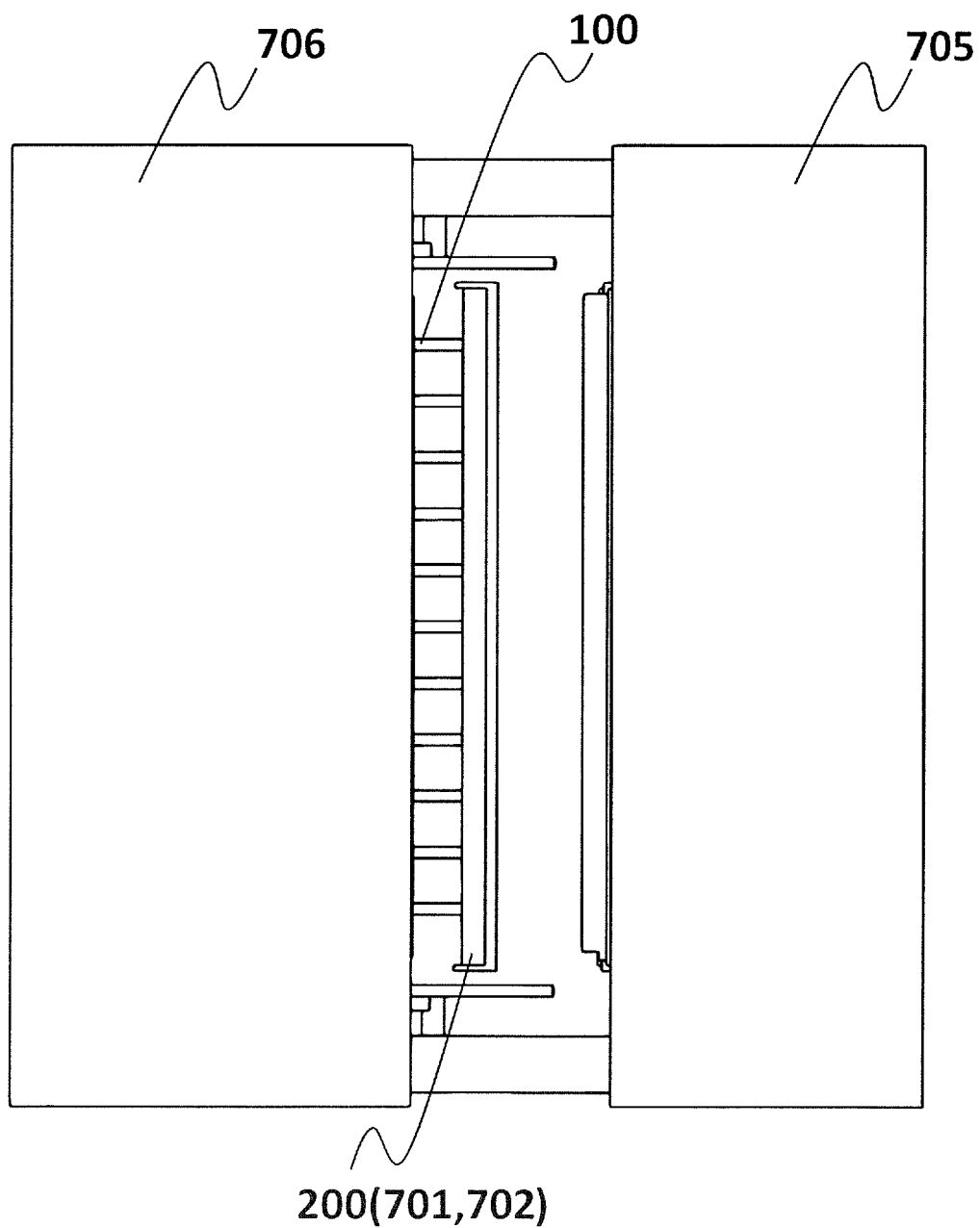
FIG. 35 is a side view of the molding assembly apparatus according to the second exemplary embodiment illustrating an operation of releasing the part from the molding assembly apparatus.

Next, the fourth step of releasing and taking out the part 200 that has been molded and assembled from the mold will be described with reference to FIGS. 33A to 35. FIGS. 34A and 34B illustrate an operation of the driving portion 710a releasing the resin member 702 from the forming portion 732, and FIG. 35 illustrates an operation of releasing the part 200 that has been molded and assembled from the movable portion 706.

As described above, for example, after the part 200 having a space therein is assembled from the resin members 701 and 702, the forming portion 732 is moved in an order reversed from the order described above, that is, in an order from FIG. 33C to FIG. 33A. In addition, FIG. 34A is a perspective view of the mold illustrating a state in which the driving portion 710a is at a position corresponding to FIG. 33C. FIG. 34B is a perspective view of the mold illustrating a state in which the driving portion 710a is at a position corresponding to FIG. 33B.

The rotation directions of the gears 820a and 821a of the driving portion 710a in this fourth step are respectively Re and Rd directions as illustrated in FIG. 34A. To be noted, it goes without saying that the driving portion 710b performs a similar operation although details thereof are not illustrated. In the case where the driving portions 710a and 710b are operated in directions opposite to the Ra and Rb directions as described above, the resin member 702 is released from the forming portion 732, that is, the piece portion 732a, as illustrated in FIGS. 33C to 33A. Then, the part 200 that has been assembled remains on the forming portion 731, that is, the piece portion 731a, as illustrated in FIG. 34B.

To realize such a configuration of mold releasing, the joint force, in other words, the holding force between the resin members 701 and 702 assembled in the third step serving as an assembly step may be set to be larger than a holding force between the forming portion 732 and the resin member 702. Such a joint force, that is, holding force between the resin members 701 and 702 can be easily realized by selecting a design condition of the fitting structure such as a clickstop therebeween.

Further, as illustrated in FIG. 35, the part 200 can be released by ejector pins 100 included in the movable portion 706, and thus the part 200 that has been molded and assembled can be taken out from the molding assembly apparatus.

As described above, according to the present exemplary embodiment, the resin members 701 and 702 constituting the part 200 is formed by injection molding in the same molding process by the first forming portion 731 and the second forming portion 732 provided on the same mold surface, the second forming portion 732 being detachable from the mold surface. Therefore, the resin members 701 and 702 can be formed by injection mold with a remarkably high precision. Further, in the present exemplary embodiment, the second forming portion 732 is detached from the mold surface and inverted and moved with respect to the mold surface of the movable portion 706 by the driving portions 710a and 710b serving as an inversion movement device. Then, the second forming portion 732 is opposed to the first forming portion 731, and the resin member 702 formed by the second forming portion 732 is mounted on the resin member 701 formed by the first forming portion 731. As described above, according to the present exemplary embodiment, the resin members 701 and 702 are assembled on the same mold surface of the movable portion 706 while being held by holding portions thereof, and thus assembly can be performed with a high precision. Therefore, the part 200 can be produced with a high precision.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A production apparatus comprising:
   a first mold including a first forming portion for forming a first member and a second forming portion for forming a second member, the first and second forming portions being arranged side by side, the first forming portion and/or the second forming portion being provided to be movable;
   a second mold;
   a drive portion configured to move the first mold or the second mold so that the first forming portion and the second forming portion of the first mold are in contact with the second mold; and
   a movement portion configured to rotate and/or move the first forming portion and/or the second forming portion to contact each other in a state in which the first forming portion holds the first member and the second forming portion holds the second member so that the first member and the second member are in contact with each other.

2. The production apparatus according to claim 1, wherein the movement portion is provided in the first mold.

3. The production apparatus according to claim 1, wherein the second mold has a surface provided with a third forming portion and a fourth forming portion, and
   wherein the first mold and the second mold are configured to be clamped together so that a first cavity is defined by the first forming portion and the third forming portion and a second cavity is defined by the second forming portion and the fourth forming portion.

4. The production apparatus according to claim 3, further comprising an injection unit configured to inject resin into at least one selected from the group consisting of the first cavity and the second cavity.

5. The production apparatus according to claim 3, wherein the first mold is configured to hold the first member formed in the first cavity and the second member formed in the second cavity.

6. The production apparatus according to claim 5, wherein the movement portion is configured to have the second member fit into or engage with the first member.

7. The production apparatus according to claim 5, further comprising an ejector pin for taking out a product formed by fitting or engaging the first member and the second member together.

8. The production apparatus according to claim 1, wherein at least one selected from the group consisting of the first forming portion and the second forming portion is configured to be detachable from the first mold.

9. The production apparatus according to claim 1, wherein the second mold includes a guide configured to fix the first mold.

10. The production apparatus according to claim 1, wherein the second mold has a surface provided with a third forming portion and a fourth forming portion.

11. The production apparatus according to claim 1, wherein the movement portion includes a plurality of gears and is configured to rotate and/or move at least one selected from the group consisting of the first forming portion and the second forming portion by moving the gears.

12. The production apparatus according to claim 3, wherein at least one selected from the group consisting of the first forming portion and the second forming portion is rotated and/or moved in a state where the first forming portion and the third forming portion do not define the first cavity.

13. The production apparatus according to claim 1, wherein the drive portion is configured to relatively move the second mold with respect to the first mold.

14. A method of producing a product, the method comprising:
preparing a first mold including a first forming portion for forming a first member and a second forming portion for forming a second member, the first and second forming portions being arranged side by side, the first forming portion and/or the second forming portion being provided to be movable;
preparing a second mold used with the first mold;
forming the first member by the first forming portion and the second member by the second forming portion; and
rotating and/or moving the first forming portion and/or the second forming portion to contact each other in a state in which the first forming portion holds the first member and the second forming portion holds the second member so that the first member and the second member are in contact with each other.

15. The method according to claim 14, wherein the first mold and the second mold are used in the forming; and
wherein the rotating and/or moving makes the second member formed by the second forming portion face the first member formed by the first forming portion.

16. The method according to claim 15, wherein the first member and the second member are fitted or engaged together by the first forming portion and/or the second forming portion being moved.

17. The method according to claim 16, further comprising:
releasing a product formed by fitting or engaging the first member and the second member together.

18. The method according to claim 17, wherein the product is a part of an image forming apparatus.

19. A non-transitory computer-readable recording medium storing a control program for causing a control apparatus to execute the method according to claim 14.

20. The production apparatus according to claim 1, wherein the movement portion is configured to move and separate the first forming portion holding the first member and/or the second forming portion holding the second member from the first mold so that the first forming portion holding the first member and the second forming portion holding the second member are in contact with each other.

21. The production apparatus according to claim 1, wherein the movement portion is configured to position a first surface opposite to the second mold on the first forming portion and a second surface opposite to the second mold on the second forming portion to face each other such that the first forming portion holding the first member and the second forming portion holding the second member are in contact with each other.

22. The production apparatus according to claim 1, wherein the movement portion is configured to contact the first forming portion holding the first member and the second forming portion holding the second member with each other and press the first forming portion holding the first member and the second forming portion holding the second member.

23. The production apparatus according to claim 1, wherein the first forming portion and the second forming portion are provided side by side on one mold surface of the first mold.

* * * * *